United States Patent [19]
Reetz

[11] Patent Number: 5,824,246
[45] Date of Patent: Oct. 20, 1998

[54] METHOD OF FORMING A THERMOACTIVE BINDER COMPOSITE

[75] Inventor: William R. Reetz, Boise, Id.

[73] Assignee: Engineered Composites, Boise, Id.

[21] Appl. No.: 487,285

[22] Filed: Jun. 7, 1995

Related U.S. Application Data

[63] Continuation-in-part of Ser. No. 468,512, Jun. 5, 1995, which is a continuation of Ser. No. 131,204, Oct. 1, 1993, which is a continuation-in-part of Ser. No. 959,228, Oct. 9, 1992, Pat. No. 5,356,278, which is a continuation-in-part of Ser. No. 677,416, Mar. 29, 1991, Pat. No. 5,155,146.

[51] Int. Cl.$^6$ ................................................ B29C 43/00
[52] U.S. Cl. ........................ 264/122; 264/126; 100/38; 100/315; 100/323; 425/384
[58] Field of Search ................................. 264/135, 126, 264/109, 120, 122, 112, 113; 100/92, 93 R, 93 P, 38, 90, 321, 323, 305, 315; 249/141; 425/420, 384, 406, 407

[56] References Cited

U.S. PATENT DOCUMENTS

| Re. 30,636 | 6/1981 | Barnes . |
|---|---|---|
| 2,347,697 | 5/1944 | Levey . |
| 2,611,941 | 9/1952 | Leitl . |

(List continued on next page.)

FOREIGN PATENT DOCUMENTS

| 0 045 216 | 7/1980 | European Pat. Off. . |
|---|---|---|
| 14 53 374 | 10/1964 | Germany . |
| 1453374B2 | 4/1969 | Germany . |
| 27 43 873 | 9/1977 | Germany . |
| 2845117C2 | 10/1978 | Germany . |
| 9201988.9 | 2/1992 | Germany . |
| 1090741 | 11/1967 | United Kingdom . |
| 1502777 | 3/1978 | United Kingdom . |
| 2004809 | 4/1979 | United Kingdom . |

OTHER PUBLICATIONS

Webster's New World Dictionary, p. 725 ©1988 "jet".
Alford et al.: Glass Microballoon Particles, a Low–Density Filler; Nov., 1961.
Geimer et al.: Carbon Dioxide Application for Rapid Production of Cement Particleboard.
Steam Injection Pressing (brochure by U.S. Dept. of Agriculture).
Geimer: Steam Injection Pressing; 1982.
Youngquist et al.: Mechanical and Physical Properties of Air–Formed Wood–Fiber/Polymer–Fiber Composites; Forest Products Journal–Jun. 1992.
TREX dat sheet.
Pathex Brochure.

Primary Examiner—David A. Simmons
Assistant Examiner—Kenneth M. Jones
Attorney, Agent, or Firm—Kolisch, Hartwell, Dickinson, McCormack & Heuser

[57] ABSTRACT

A method of forming a thermoactive binder composite product is performed by injecting a hot dry gas to activate the thermoactive binder. In the preferred embodiment, the hot dry gas is air. The method is particularly beneficial as applied to forming thermoplastic composite products and particularly thermoplastic/cellulose composites. Also part of the present invention is a two stage pressing process in which hot gas is injected during the first stage and the press charge is precompressed. The press charge is then placed in a second consolidation press where the hot gas is no longer injected and it is consolidated and cooled. Machinery for practicing the method includes a platen with a platen press which includes upper and lower platens with a plurality of hot air injection jets disposed on the surface of each platen. The platens are spaced apart and surrounded on the sides by an air-permeable containment shell structure to form a compression chamber to hold the base material to be pressed. Other machinery includes a consolidation press.

28 Claims, 13 Drawing Sheet

U.S. PATENT DOCUMENTS

| | | |
|---|---|---|
| 2,649,034 | 8/1953 | Gramelspacher . |
| 2,953,187 | 9/1960 | Francis, Jr. . |
| 3,019,483 | 2/1962 | Schultheiss . |
| 3,023,136 | 2/1962 | Himmelheber . |
| 3,025,202 | 3/1962 | Morgan et al. . |
| 3,104,085 | 9/1963 | Skladany . |
| 3,146,285 | 8/1964 | Munk . |
| 3,146,508 | 9/1964 | Berliner et al. . |
| 3,163,888 | 1/1965 | Shattuck . |
| 3,164,511 | 1/1965 | Elmendorf . |
| 3,187,691 | 6/1965 | Leitzel . |
| 3,257,338 | 6/1966 | Sefton . |
| 3,280,237 | 10/1966 | Corbin et al. . |
| 3,359,929 | 12/1967 | Carlson . |
| 3,383,228 | 5/1968 | Rekate et al. . |
| 3,391,233 | 7/1968 | Polovtseff . |
| 3,435,784 | 4/1969 | Peterson . |
| 3,440,072 | 4/1969 | Daubenspeck . |
| 3,483,597 | 12/1969 | Windeler et al. . |
| 3,503,840 | 3/1970 | Parrish . |
| 3,547,840 | 12/1970 | Stastny et al. . |
| 3,567,815 | 3/1971 | Frank . |
| 3,611,952 | 10/1971 | Hoffman . |
| 3,644,271 | 2/1972 | Tulley . |
| 3,661,688 | 5/1972 | Wheeler .................................. 264/119 |
| 3,671,615 | 6/1972 | Prize ........................................ 264/115 |
| 3,685,932 | 8/1972 | Pfeiffer . |
| 3,694,118 | 9/1972 | Crowder . |
| 3,708,256 | 1/1973 | Kopp . |
| 3,718,536 | 2/1973 | Downs et al. . |
| 3,720,176 | 3/1973 | Munroe . |
| 3,734,985 | 5/1973 | Greenberg . |
| 3,775,033 | 11/1973 | Pfeiffer . |
| 3,790,421 | 2/1974 | Habgood, Jr. . |
| 3,807,562 | 4/1974 | Lamort et al. . |
| 3,846,265 | 11/1974 | Yamaguchi et al. . |
| 3,876,744 | 4/1975 | Onder . |
| 3,891,738 | 6/1975 | Shen . |
| 3,914,359 | 10/1975 | Bevan . |
| 3,940,230 | 2/1976 | Potter . |
| 3,956,541 | 5/1976 | Pringle ..................................... 264/109 |
| 3,958,069 | 5/1976 | Gaylord . |
| 3,983,295 | 9/1976 | Murer et al. . |
| 3,995,980 | 12/1976 | Smith . |
| 3,998,580 | 12/1976 | Pfiffer . |
| 4,011,183 | 3/1977 | Ruff . |
| 4,014,826 | 3/1977 | Yunan . |
| 4,027,543 | 6/1977 | Johnston . |
| 4,031,179 | 6/1977 | Tatzel et al. . |
| 4,053,004 | 10/1977 | Barwise et al. . |
| 4,061,813 | 12/1977 | Geimer et al. . |
| 4,073,851 | 2/1978 | Munk . |
| 4,078,030 | 3/1978 | Munk et al. . |
| 4,084,966 | 4/1978 | Haas et al. . |
| 4,085,247 | 4/1978 | Godfried . |
| 4,101,050 | 7/1978 | Buckler et al. . |
| 4,115,509 | 9/1978 | Kendall-Smith . |
| 4,127,635 | 11/1978 | Gauthier . |
| 4,131,664 | 12/1978 | Flowers . |
| 4,131,705 | 12/1978 | Kubinsky . |
| 4,182,641 | 1/1980 | Fitts . |
| 4,203,755 | 5/1980 | Ruckstuhl . |
| 4,221,751 | 9/1980 | Haataja et al. . |
| 4,229,398 | 10/1980 | Harvey . |
| 4,230,049 | 10/1980 | Horne . |
| 4,241,133 | 12/1980 | Lund et al. . s |
| 4,248,163 | 2/1981 | Caughey . |
| 4,248,820 | 2/1981 | Haataja . |
| 4,267,137 | 5/1981 | Smith . |
| 4,273,981 | 6/1981 | Nopper . |
| 4,290,988 | 9/1981 | Nopper et al. . |
| 4,303,019 | 12/1981 | Haataja et al. . |
| 4,316,934 | 2/1982 | Maier et al. . |
| 4,318,351 | 3/1982 | Munk . |
| 4,322,260 | 3/1982 | Conlon . |
| 4,337,710 | 7/1982 | Haataja et al. . |
| 4,339,040 | 7/1982 | Peil et al. . |
| 4,350,548 | 9/1982 | Zenbayashi et al. . |
| 4,358,418 | 11/1982 | Heggenstaller . |
| 4,361,613 | 11/1982 | Bogner et al. . |
| 4,364,984 | 12/1982 | Wentworth . |
| 4,382,758 | 5/1983 | Nopper et al. . |
| 4,385,564 | 5/1983 | Heggenstaller . |
| 4,393,019 | 7/1983 | Geimer . |
| 4,408,544 | 10/1983 | Haataja . |
| 4,409,170 | 10/1983 | Stofko ...................................... 264/122 |
| 4,413,969 | 11/1983 | McDonald . |
| 4,421,710 | 12/1983 | Borcoman . |
| 4,440,708 | 4/1984 | Haataja et al. . |
| 4,454,940 | 6/1984 | Ufermann . |
| 4,465,359 | 8/1984 | Haas et al. . |
| 4,467,728 | 8/1984 | Horne . |
| 4,469,216 | 9/1984 | Haataja et al. . |
| 4,470,498 | 9/1984 | Lund et al. . |
| 4,483,668 | 11/1984 | Poppelreuter . |
| 4,508,772 | 4/1985 | Churchland et al. . |
| 4,517,147 | 5/1985 | Taylor et al. ............................ 264/120 |
| 4,517,148 | 5/1985 | Churchland . |
| 4,517,308 | 5/1985 | Ehlenz et al. . |
| 4,521,477 | 6/1985 | Kiss . |
| 4,537,823 | 8/1985 | Tsang et al. . |
| 4,555,439 | 11/1985 | Ueeda et al. . |
| 4,559,194 | 12/1985 | Hegenstaller . |
| 4,559,195 | 12/1985 | Heggenstaller . |
| 4,563,237 | 1/1986 | Churchland et al. . |
| 4,591,467 | 5/1986 | Kopernicky . |
| 4,596,738 | 6/1986 | Metcalfe et al. . |
| 4,603,078 | 7/1986 | Zanker et al. . |
| 4,609,519 | 9/1986 | Pichard et al. .......................... 264/120 |
| 4,610,913 | 9/1986 | Barnes . |
| 4,623,150 | 11/1986 | Moehlman et al. . |
| 4,632,564 | 12/1986 | Kopernicky . |
| 4,636,084 | 1/1987 | Kopernicky . |
| 4,636,085 | 1/1987 | Kopernicky . |
| 4,643,940 | 2/1987 | Shaw et al. . |
| 4,647,324 | 3/1987 | Mtangi et al. ........................... 264/121 |
| 4,668,562 | 5/1987 | Street . |
| 4,674,414 | 6/1987 | Nulle et al. . |
| 4,675,141 | 6/1987 | Kumazaki . |
| 4,705,472 | 11/1987 | Heggenstaller . |
| 4,706,799 | 11/1987 | Churchland et al. . |
| 4,710,520 | 12/1987 | Klein . |
| 4,718,839 | 1/1988 | Paakkinen . |
| 4,751,131 | 6/1988 | Barnes . |
| 4,753,693 | 6/1988 | Street . |
| 4,781,171 | 11/1988 | Hemsath . |
| 4,790,966 | 12/1988 | Sandberg et al. . |
| 4,822,694 | 4/1989 | Randin et al. . |
| 4,850,849 | 7/1989 | Hsu . |
| 4,872,544 | 10/1989 | Churchland et al. . |
| 4,940,502 | 7/1990 | Marcus ..................................... 264/126 |
| 4,950,362 | 8/1990 | Steinau et al. . |
| 4,960,553 | 10/1990 | DeBruine et al. . |
| 4,997,607 | 3/1991 | Nopper et al. . |
| 5,023,027 | 6/1991 | Nopper . |
| 5,028,374 | 7/1991 | Imao et al. .............................. 264/121 |
| 5,084,221 | 1/1992 | Matsuno et al. . |
| 5,088,910 | 2/1992 | Goforth et al. . |
| 5,094,791 | 3/1992 | Nopper . |
| 5,096,655 | 3/1992 | Baxi et al. . |
| 5,096,765 | 3/1992 | Barnes . |
| 5,096,945 | 3/1992 | Sun . |

| | | | | | | |
|---|---|---|---|---|---|---|
| 5,100,601 | 3/1992 | Heggenstaller et al. . | | 5,169,580 | 12/1992 | Marcus ..................................... 264/126 |
| 5,106,438 | 4/1992 | Nopper et al. . | | 5,294,392 | 3/1994 | Marcus . |
| 5,123,359 | 6/1992 | DelBalso . | | 5,356,278 | 10/1994 | Reetz . |
| 5,142,994 | 9/1992 | Sandberg et al. . | | 5,380,180 | 1/1995 | Lamb, Sr. . |
| 5,154,969 | 10/1992 | Kerawalla ............................... 428/288 | | 5,435,954 | 7/1995 | Wold . |
| 5,155,146 | 10/1992 | Reetz . | | 5,500,295 | 3/1996 | Halm et al. . |
| 5,158,012 | 10/1992 | Gawlitta et al. ........................ 425/420 | | 5,539,027 | 7/1996 | Deaner et al. . |

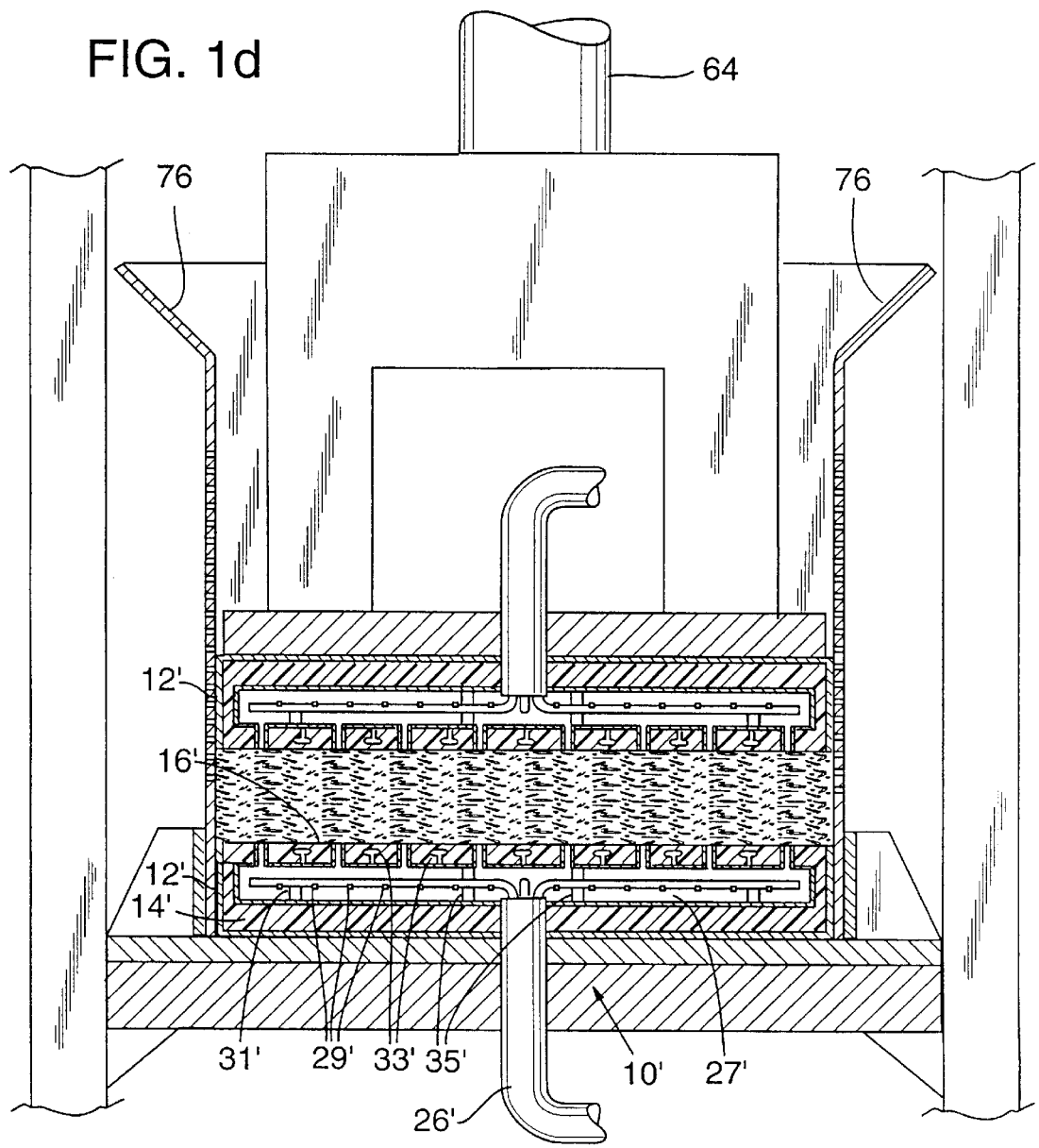

METHOD OF FORMING A THERMOACTIVE BINDER COMPOSITE

CROSS REFERENCE TO RELATED APPLICATIONS

This application is a continuation-in-part of application Ser. No. 08/468,512, filed Jun. 5, 1995, which is a continuation of application Ser. No. 08/131,204, filed Oct. 1, 1993, which is a continuation-in-part of application Ser. No. 07/959,228, filed Oct. 9, 1992, now U.S. Pat. No. 5,356,278, which is a continuation-in-part of application Ser. No. 07/677,416, filed Mar. 29, 1991, now U.S. Pat. No. 5,155, 146.

BACKGROUND

The present invention relates to a novel method and structure for forming composite products using thermoactive binders, and more particularly to the novel technique of injecting a hot non-condensable gas into a loose base material including a thermoplastic or thermoset component, thereby heating the base material and binding the composition.

FIELD OF THE INVENTION

The two dominant thermoactive binders are thermoset and thermoplastic compounds. Thus, the field of forming composite products from thermoactive binder and filler constituents can be divided into two major branches based upon the characteristics of the binder used, i.e. thermoplastic or thermoset.

In the production of reconstituted cellulose products, thermoset polymers are used. For example, to fabricate panels from reconstituted wood, such as wafer board or medium density fiber board, a thermosetting polymer binder is mixed with wood fibers or particles to form a mat. The mat is then placed between platens and compressed. During pressing, heat is supplied to the mat to soften it, thereby making the mat easier to compress and also to cure the thermoset-polymer binder. The time spent in pressing/heating the binder to soften and ultimately cure it slows the production of composite boards, and, to a large extent, that time is dependent on the mechanism of heat transfer used to supply heat to the mat. Minimizing the press time required to form a product is desired. By way of illustration, each one second reduction in the press cycle in a large scale particle board plant can result in increased annual sales of about 35,000.

In conventional pressing of reconstituted wood panels heat is transferred to the mat by conduction from heated platen surfaces. Because of the poor thermal conductivity of the cellulose and thermoset polymer constituents, this method requires that the mat remain in the press for a substantial amount of time to allow the core temperature of the mat to be raised to a level sufficient to cure the thermoset polymer binder and complete panel formation. This is particularly a problem with thick mats because press time increases dramatically with increasing mat thickness.

Attempts have been made to reduce press time in conduction pressing by increasing the temperature of the platens. However, only slight reductions in press time were achieved, and increased platen temperature scorched or otherwise damaged the panels.

Conventional proposals to reduce press time have also included the use of steam to transfer heat to mats by convection, thereby taking advantage of the natural porosity of the mats. One well known method using convective heat transfer is the "steam shock" or "steam jet" technique wherein mats laden with surface moisture are contacted with hot platens that vaporize the water. The resultant steam moves quickly toward the center of the mat, thereby raising the core temperature. More water can be used to increase the resulting core temperature.

However, such steam proposals suffer from drawbacks as well because more press time is required to rid the mat of excess moisture. Also, the surface of the panel often blisters due to the steam heat. Similar mixed results have been observed with other steam proposals such as systems that direct steam to the mat via perforated platens.

Regardless of the method used, a core temperature of 150°–350° F. must be obtained to effect efficient cure of most thermoset compounds. Generally speaking, thermoset compounds that cure at lower temperatures are preferred because of the lower overall cycle time required.

Shifting focus from thermoset to thermoplastic binders, the general idea is to bind filler particles, which may be powdered or non-powdered, with thermoplastic compounds. Presently, there are at least two known methods of mixing thermoplastic compounds with powdered filler particles. In one method, solid thermoplastic pellets and powdered filler particles are pre-mixed and then passed through a heated extruder to melt the pellets. The pellets and particles are then mixed by a mechanical device and ejected from the extruder. In another method, heat and extremely high pressure are used to force the mixture of thermoplastic pellets and powdered filler particles through a die and into a mold.

One commercial example of a process for forming a thermoplastic polymer and powdered filler composite adapts existing plastic extruder technology to process a combination of sawdust and polyethylene film in a screw extruder. This technology, however, has serious limitations. First, tolerances in the screw extruder permit only sawdust sized cellulose particles to be used. This drastically reduces the strength and stiffness of the material, since fiber length and orientation contribute substantially to the mechanical properties of a composite material. This method is also limited to a mix of about 50/50 thermoplastic-to-cellulose because of the melt/flow restrictions of the extruder. Greater than 50% cellulose results in an unacceptable product. That limitation has economic consequences because cellulose is included primarily to reduce the cost and weight of the final product.

There are at least three conventional methods to mix thermoplastic polymers with non-powdered fillers. In one method, filler particles are individually dipped in a hot viscous bath of thermoplastic, and then after cooling, the dip-coated filler particles are woven into a fabric like form. Next, the resulting fabric-like material is positioned in a mold with additional thermoplastic material. Heat is then applied, causing the thermoplastic to melt into and around areas of the fabric-like material to fill in dry spots the dip-coating step may not have covered.

A second method involves extremely high pressure injection of thermoplastic material into a mold to coat filler particles. However, only certain types of fillers may be utilized with this technique.

In addition, it is known to make relatively thin sections of composite material by layering thermoplastic pellets and filler material in a mold followed by heating the mold.

One further example of mixing thermoplastic polymers and non-powdered fillers is taught in U.S. Pat. No. 5,088, 910. That method adapts conventional platen press and plastic compression molding technologies to form a thermoplastic composite. In this method, a machine blends stringy cellulose fibers, such as straw, and strands of polypropylene into a loosely knit mat. The mat is then placed in a conventional platen press with platens that may be heated or cooled. The resultant material, which is used to make automotive interior trim parts, is sufficiently strong due to the length of the cellulose fibers and their orientation. It is also less expensive and lighter than a comparable plastic part. The method, however, is energy intensive since the entire mass of the platens must be heated and cooled for each press cycle. It is also limited to relatively thin sections because of the thermal characteristics of the plastic and the consequent increase in cycle time that occurs when attempting to heat thick sections from the surface.

Generally speaking, conventional methods of making thermoplastic composites are expensive and limited compared to those for making thermoset composites. A key reason for such a distinction is the relatively high viscosities associated with thermoplastics, which make it difficult to obtain the necessary wetting of the filler particles to produce a uniform, cohesive end product. Thermoplastics typically also have a relatively high melting point and therefore require high temperatures to form a liquid adhesive. The core temperature required to form thermoplastic composites (about 380° F. ) is thus much higher than what is needed to cure thermoset composites (the range of about 200°–350° F.). In addition, thermoplastics have a very low coefficient of thermal conductivity, which means that it takes a long time to melt the plastic in the core of a thick mat when heat is only applied on the surfaces, as in a conventional platen press. For example, it takes about 20 minutes to melt the thermoplastic to form a ½ inch thick thermoplastic composite board using a conventional platen press with heated platens.

It is also possible to use microwave or radio frequency radiation to supply the heat to the composite. While both these approaches work, they are very expensive and not very reliable if the moisture content of the cellulose component varies.

In spite of the process difficulties mentioned above, there are substantial benefits associated with using thermoplastic polymers to form composite products. First, the recent trend toward increased recycling and preservation of environmental resources has created a substantial demand for methods of reusing thermoplastics. A substantial fraction of household waste incorporates thermoplastic polymers that may be used as a source of thermoplastic for forming composite products. EPA statistics indicate that plastics constitute approximately 7.3% of all waste in the U.S. Only about 1% of this amount is recycled. Plastic production in the U.S. is expected to reach 76 billion pounds per year by the year 2000. Thus, a process that can put any portion of this waste to beneficial use offers substantial societal rewards.

Thermoplastics are also desirable because they are generally less expensive than thermoset polymers. They are also reusable since they can be repeatedly reused by remelting, in contrast to thermoset polymers, which are rendered unusable if melted after curing. In some cases, the desired properties of a composite may require the use of thermoplastic polymers instead of thermoset polymers.

It is therefore an object of this invention to provide a process of forming a composite product using a thermoactive binder and large filler particles.

It is another object of this invention to provide a process of forming a thermoplastic product using waste thermoplastic.

One more object of the present invention is to provide a method and apparatus for forming thermoplastic products using waste thermoplastic which can accept color contamination and contamination from foreign substances such as labels, glue and residual organic matter.

It is yet another object of this invention to form a thermoactive binder composite product with continuous reinforcing material.

A further object of the present invention is to be able to vary the properties of the thermoactive binder composite product by zoning.

Yet a further object of the present invention is to provide an energy efficient process of forming a product using a thermoactive binder.

An additional object of the invention is to provide a process for forming a product using a thermoactive binder with waste energy from other industrial processes to supply the heat necessary to form the product.

One more object of the present invention is to provide a method of forming a product with a thermoactive binder that can be applied to form deep-drawn formed parts.

It is another object of the invention is to provide a method of forming a product with a thermoactive binder that can be applied to form sheet products.

Yet one more object of the invention is to provide a method of form a product with a thermoactive binder that can be applied to forming extruded products.

A further object of the current invention is to provide a method of forming a product with a thermoactive binder that has faster cycle time and greater production rate than current techniques.

Another object of the present invention is to provide a method of manufacturing thermoplastic parts that does not require expensive machining.

An object of the present invention is also to provide a method of forming a thermoactive binder composite product using a heating step followed by a cold consolidation step.

An additional object of the current invention is to provide a method of forming a product with a thermoactive binder in a platen press with unheated press platens.

Yet a further object of the present invention is to provide a press platen adapted to inject hot gas into a press charge.

Another object of the present invention is to provide a press platen with an insulating surface for contacting the press charge.

One more object of the present invention is to provide a press adapted to form thermoactive binder composite products using hot gas as a heat source.

It is another object of the present invention to provide a containment shell to contain a loose press charge of raw materials during the injection of hot gas and compression of the charge.

Yet one more object of the present invention is to provide a method for forming composite products with thermoplastic binders and filler particles, where the filler particles are between ¼- and 6-inches long.

SUMMARY OF THE INVENTION

The present invention achieves the above objects by providing a method of supplying heat to form a thermoactive binder/filler composite product by injecting, infusing or blowing hot air into a base material that is a loose mixture of thermoactive binder pieces and filler particles. The injection of hot air effectively heats and activates the binder component—melting in the case of a thermoplastic binder or accelerating the cure for thermoset binders. The hot air effectively raises the temperature of the binder so that it is unnecessary to supply additional heat through the platens.

The present invention also embodies a platen press, and method of using the same, for manufacturing flat panels or deep drawn (more than two inches) formed parts (i.e. parts having thicknesses ≧2-inches). The press includes upper and lower platens with a plurality of hot air injection jets disposed on the surface of each platen. The platens are spaced apart and surrounded on the sides by an air-permeable containment shell structure, thus forming a compression chamber to hold the base material to be pressed. Once the base material is placed in the compression chamber, hot air is injected therein and the platens are brought together. The injection of hot air is then stopped and the base material is lightly pressed into a pre-formed part. The resultant pre-formed part is removed from the hot air press and pressed into the final form in a consolidation press.

The present invention also includes a novel platen construction adapted to the various methods described herein. In particular a platen is provided that has substantial insulating properties so as to minimize absorption of heat from the hot air or thermoactive binder/filler mixture after the hot air is injected. Other features of the platen construction provide an optimal distribution of hot air flow into the base material.

The term thermoactive binder is used herein to refer to any compound that can be activated to function as a binder by heating. The two primary examples are thermoset and thermoplastic compounds. Because thermoplastic compounds melt when heated, they can serve as a binder by flowing around the filler particles and holding them cohesively upon cooling. For thermoset compounds the binding results from crosslinking polymerization upon curing usually induced by the application of heat. While thermoset and thermoplastic compounds are the primary examples of thermoactive binders, any other substance that can function as a heat-activable binder could be suitable for use in the present invention. The present invention is also usable to form a product from 100% binder, in which case the binder need only adhere to itself and not necessarily a filler component.

It is important to obtain thorough mixing of the thermoactive binder and filler. If discrete thermoactive binder pieces and filler particles are used, they should preferably be of generally the same size and weight. This helps to achieve adequate inter-suspension of pieces and particles in the mixture and facilitates proper wetting of the filler particles. If a liquid thermoset resin is used as the thermoactive binder, it may be sprayed over the filler to accomplish the same result. Similarly, powdered thermoactive binders may be applied to the filler particles to create the desired dispersion. If necessary, a tackifier, such as Eastman G0003 wax, may be sprayed on the filler prior to dispersing the powdered binder over it to insure that the binder adheres to the filler.

To achieve the desired physical properties in the final product it may be beneficial to add a coupling agent to the composite during processing. A coupling agent may be sprayed on the particles to increase the bond between the thermoplastic binder and cellulose filler, thereby increasing the strength of the final product. A fire retardant may also be added to provide additional fire resistance in the final product.

Thermoactive binders in the form of granules or pellets will also function in the present invention, but are not preferred because of the difficulty of obtaining sufficient mixture and suspension with the filler. In addition, thermoactive active binder configurations having relatively large dimensions heat much more slowly, thus resulting in a longer cycle time and lower production rates. The invention has also been applied successfully to form composite products from dust-sized thermoactive pieces and filler particles. With smaller pieces and particles, securing adequate gas permeation is critical.

Thermoplastic, as used herein, means a polymer that softens and becomes flowable or tacky upon heating and returns to its original condition when cooled back to room temperature. The thermoplastic material used in the present invention may be any moldable or extrudable plastic material. Examples of suitable polymeric materials include, but are not limited to, the polyamides, such as caprolactam (Nylon 6), polyhexamethylene adipamide (Nylon 66) and copolymers thereof; polyolefins and copolymers of the polyolefins, such as polyethylene (both low, medium, and high density), polypropylene, polybutene-1, poly-4-methyl pentene-1, and copolymers of these and other olefinic co-monomers (such as vinyl chloride, methyl methacrylate, vinyl acetate, acrylic acid); polystyrene and copolymers of polystyrene with other co-monomers (such as styrene-acrylonitrile copolymers, acrylonitrile-butadiene-styrene copolymers, styrene-butene-I-acrylonitrile copolymers); polycarbonates, polysulfones, polyesters, polymethacrylates, polyvinyl chloride, polyvinylidene chloride, and copolymers of vinyl chloride and vinylidene chloride with other co-monomers such as ethylene, vinyl acetate, ethyl methacrylate and others.

Most preferably, the thermoplastic component in the present invention is composed of thermoplastic fluff, defined as any mixture of thermoplastic and filler, or thermoplastic alone, having a density less than or equal to 15 pounds per cubic foot. This could include uncompressed shredded polyethylene grocery bags, milk cartons or polypropylene sections of baby diapers. A particularly suitable composition may be made in accord with the teachings of U.S. Pat. Nos. 5,155,146 and 5,356,278 and application Ser. No. 08/131,204, to the present inventor, which patents and application are incorporated herein by reference. In general, however, any thermoactive binder composition having a configuration sufficiently non-compact, loose or gas permeable to allow the hot gas to flow in and around the thermoactive binder to supply the necessary heat should be adaptable for use in the present invention.

The characteristics of the filler may be selected to give the final product the desired properties. For instance, it would be possible to treat filler particles with a preservative to prevent rot in the final product. The same effect might also be achieved by grinding up pre-treated, and possibly recycled, materials such as used railroad ties. The tensile strength and other similar properties can also be chosen to provide products with desired physical attributes.

The term thermoset is used to specify compounds, generally polymers, that solidify or set irreversibly when heated. Examples may include phenolics, alkyds, amino resins, polyesters, epoxides, and silicones, as well as compounds that additionally require some additive such as organic peroxides to set.

The term dry gas is used herein to designate a gas in which water is not the primary component. It is not meant to exclude air, for instance, where water vapor may be present in small quantities. In particular, the amount of water vapor preferably should not substantially exceed the saturation point of the gas at room temperature, thereby insuring that the water will not condense when the object is cooled, or on the cool press parts.

The term non-condensable gas refers to an element or compound that remains in a gaseous phase at ambient conditions. Examples would include, air, nitrogen, carbon dioxide, etc. Steam is an example of a condensable gas, i.e. steam condenses at room temperature and pressure to a liquid. In the present invention the preferred non-condensable gas is air.

One of the benefits of using a non-condensable gas is that the pressure and temperature of the gas can be controlled independently. With steam, high pressures must be maintained to obtain high temperatures. When a non-condensable gas is used, high temperatures can be created and maintained even with relatively low gas pressure. For purposes of simplicity, the dry or non-condensable gas of the present invention has been, and generally will be referred to in the subsequent description simply as air or hot air because air is the preferred gas. No limitation to the terms dry or non-condensable gas by use of the terms hot air or air.

In general, a thermoactive binder will have an activation temperature at which it will become effective as a binder. For thermoplastics this temperature relates to the point at which they become flowable, tacky, or melt sufficiently to wet the filler and form a cohesive product. This melting transition occurs gradually as a function of temperature. Therefore it is not possible to precisely define an activation temperature to which the hot air must heat the thermoplastic. Rather, the activation temperature is determined as the minimum temperature at which the thermoplastic becomes sufficiently non-viscous to wet the filler component, if any, and bind to form a cohesive solid upon cooling. Depending upon the nature of the filler particles, different reductions in viscosity may be necessary to wet and bind the filler particles to form a cohesive end product. For rough or irregular filler particles, the thermoplastic component may need to become quite flowable. On the other hand, if no filler particles are used, the thermoplastic may form a cohesive product while remaining quite viscous, i.e. at lower temperatures. Therefore, for some types of thermoplastics, the temperature of the hot gas may only need to be in range of 250° F., although 400° F. to 600° F. is more typical.

Activation for thermoset compounds relates to the curing process. Since the cure rate for thermoset polymers generally increases with increasing temperature, rather than being triggered at a defined temperature, there is no defined activation temperature. Thus, the activation temperature for thermoset compounds is set to produce the fastest cure possible without inducing localized non-uniform curing. For some thermoset composites, hot air having a temperature in the range of 100° F. to 200° F. might accelerate cure to the desired rate, while for other thermoset composites the required temperature will be higher.

Given that the thermoactive binder must be heated to some activation temperature $T_{activate}$, the quantity of air injected to heat the thermoactive binder must be sufficient to supply enough energy to raise the temperature of the binder from its initial temperature of $T_{start}$, to the final temperature $T_{activate}$. The maximum Heat H supplied by the gas to the binder is $H = m_{gas} c_{gas} (T_{gas} - T_{binder})$. Similarly, an amount of Heat H will raise the temperature of the binder, at a maximum, according to the formula $H = m_{binder} c_{binder} (\Delta T_{binder})$. Equating these two formulas and integrating from the starting binder temperature $T_{binder}$ to the final temperature $T_{activate}$, the minimum mass of gas needed to heat the binder to $T_{act}$ is given by the formula:

$$m_{gas} = m_{binder} \left( \frac{c_{binder}}{c_{gas}} \right) \ln \left( \frac{T_{gas} - T_{binder}}{T_{gas} - T_{activate}} \right)$$

where:
$m_{gas}$=mass of gas injected,
$m_{binder}$=mass of thermoactive binder component,
$c_{binder}$=specific heat of the thermoactive binder component,
$c_{gas}$=specific heat of the gas,
$T_{activate}$=activation temperature of the thermoactive binder,
$T_{binder}$=starting temperature of thermoactive binder, and
$T_{gas}$=temperature at which gas is injected.

If supplemental heat $H_s$ is supplied from another source, such as heated platens, the formula setting the lower limit on the mass of gas injected into the material includes an additional term to offset the supplemental heat as follows:

$$m_{gas} > m_{binder} \left( \frac{c_{binder}}{c_{gas}} \right) \ln \left( \frac{T_{gas} - T_{binder}}{T_{gas} - T_{activate}} \right) - \frac{H_s}{c_{gas}} \left( \frac{1}{T_{gas} - T_{activate}} \right)$$

From the standpoint of energy efficiency, it is, of course, desirable to reduce the gas injected to as close as possible to the absolute thermal minimum set forth in the equations above.

BRIEF DESCRIPTION OF DRAWINGS

FIGS. 1a–g show three alternative embodiments of a platen according to the present invention.

DETAILED DESCRIPTION OF THE PREFERRED EMBODIMENTS

Platen

Figure 1A:
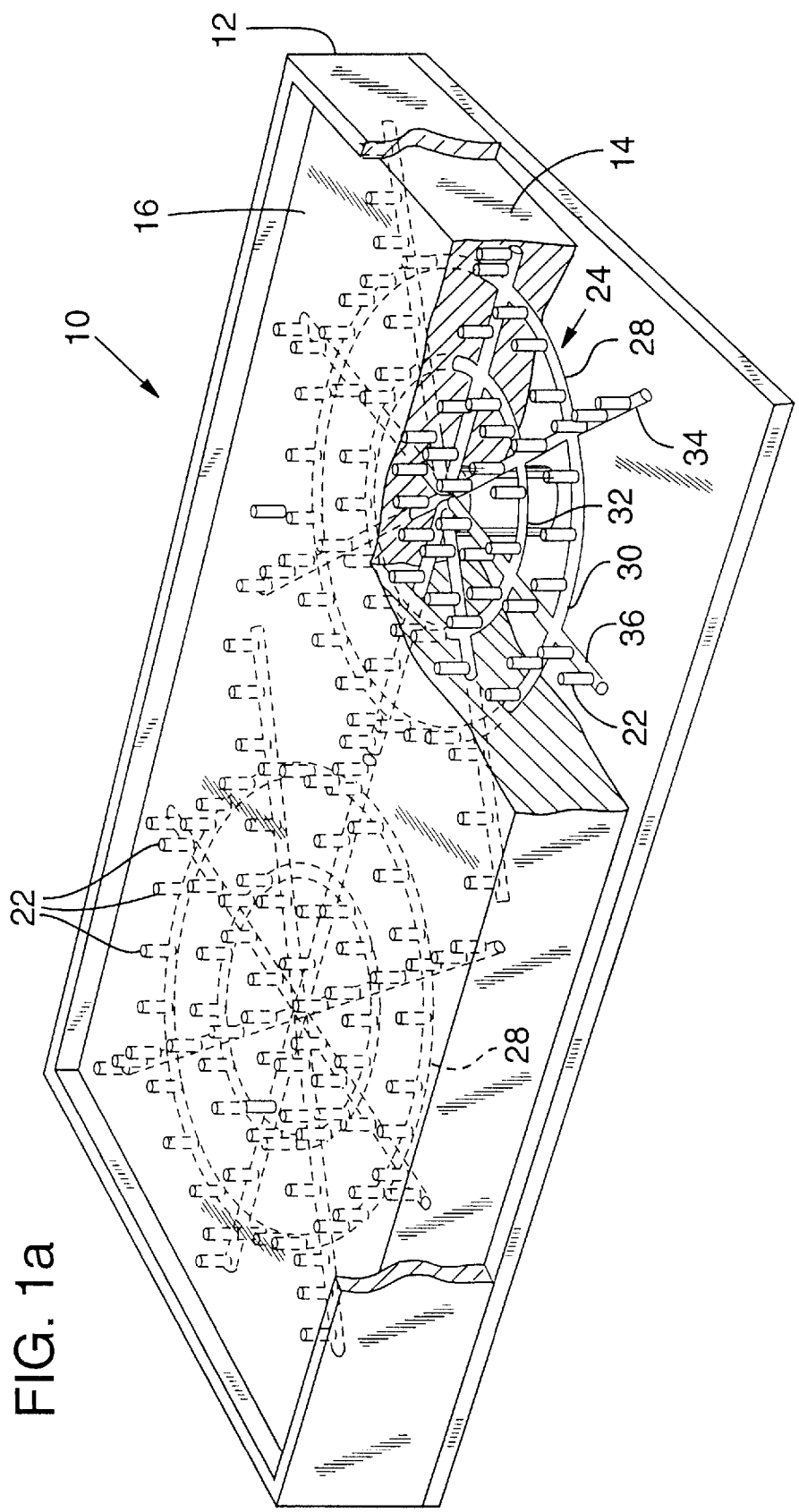
Figure 1B:
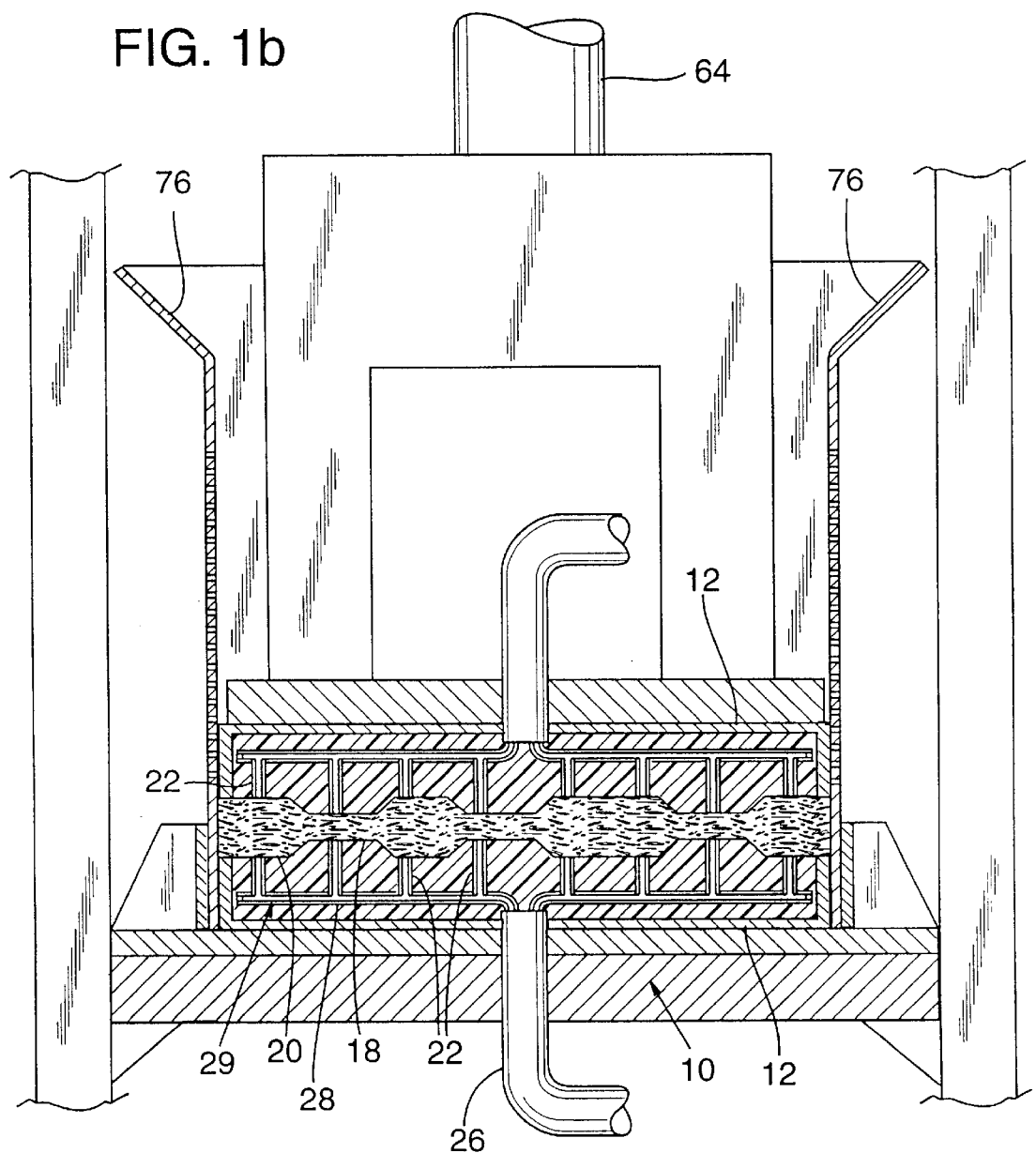

A platen 10 made according to the preferred embodiment of the present invention is shown in FIG. 1a. Platen 10 is designed to compress and deliver heat to a press charge in a press. Platen 10 includes a support frame 12 which holds a die 14. One surface of die 14 forms an inner face 16 for contacting the press charge. Inner face 16 may be made flat or formed with protrusions 18 and/or depressions 20 to shape the product being pressed as shown in FIG. 1*b*. Die 14 is formed of high temperature (600° F.) RTV rubber, such as Dow Chemical 3120 RTV Rubber, by casting. Protrusions 18 and depressions 20 are incorporated into die 14 directly during the casting process.

Platen 10 further includes a plurality of air jets 22 disposed in die 14 and opening onto inner face 16. Air jets 22 provide the injection points where the hot air is injected into the press charge. An air distribution manifold 24 is cast into die 14 and disseminates the hot air from two intake tubes 26 to air jets 22. Manifold 24 includes two identical sub-manifolds 28, each of which is made up of a large (7.5 inch diameter) circular duct 30, a small (4.5 inch diameter) circular duct 32, four large (6.5 inch×2 inch) L-shaped ducts 34, and four small (4.5 inch×2 inch) L-shaped ducts 36. The shorter legs of the eight L-shaped ducts 34, 36 are bundled together in intake tubes 26. The circular ducts 30, 32 are placed concentrically with each other around intake tubes 26 and joined to L-shaped ducts 34, 36 which project radially from intake tubes 26. Ducts 30–36, and air jets 22, are formed of ¼ inch O.D. hydraulic tubing.

Air jets 22 are welded to ducts 30–36 of manifold 24. During the casting of die 14 a nail is placed in the end each of air jet 22 to prevent the RTV rubber from entering and to aid in locating air jets 22 after die 14 is formed. The length of air jets 22 helps to prevent the air from separating die 14 from manifold 24. Air jets 22 are positioned in die 14 to provide uniform air circulation through the press charge, which is critical to forming a cohesive end product without unbonded pockets or areas. A greater number of air jets 22 are required for a press charge of smaller powdered pieces and particles as compared to a press charge of larger flake-like pieces and particles.

Figure 1C:
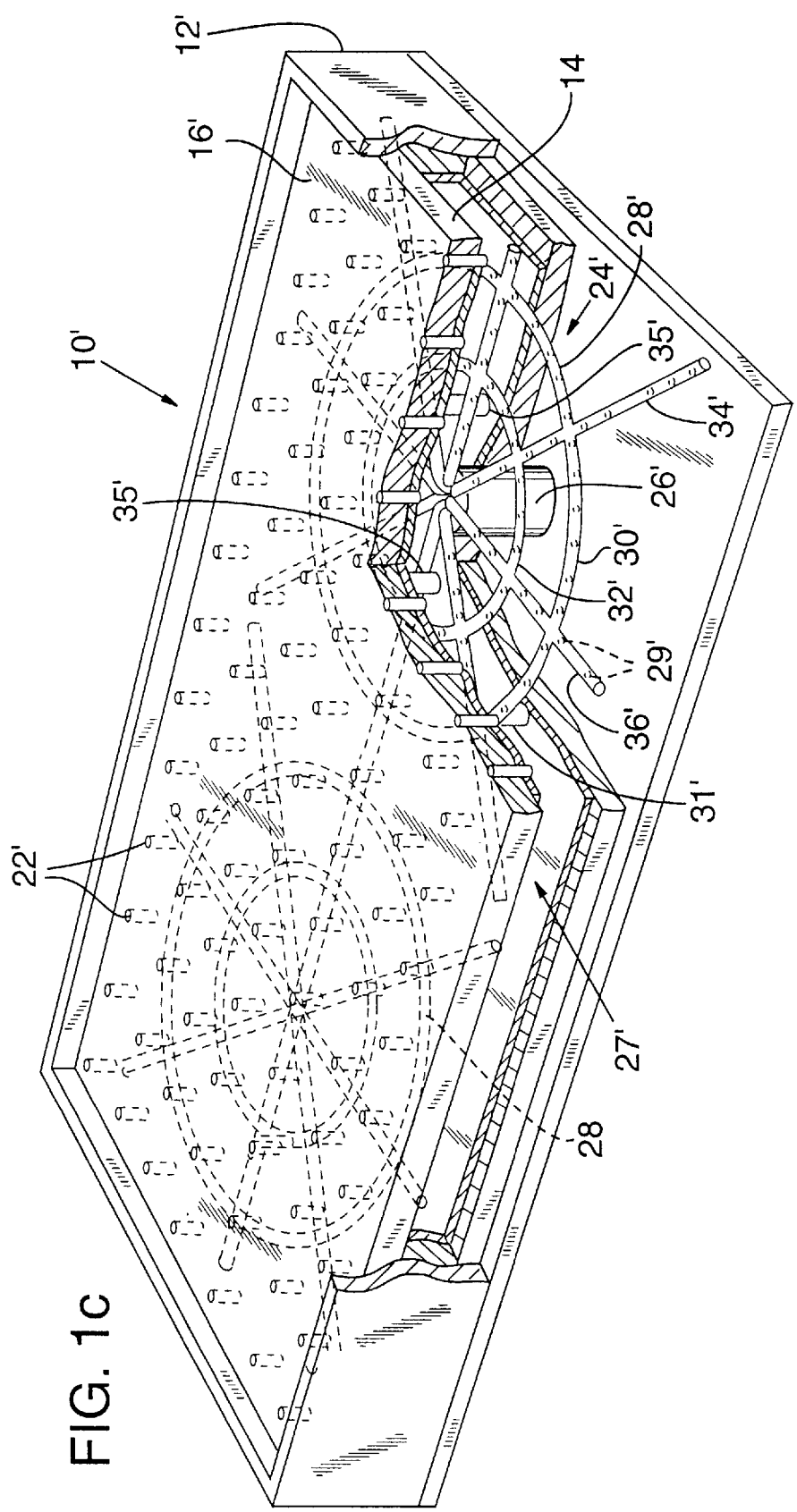

An alternative embodiment of the platen described above is shown generally at 10' in FIGS. 1*c–d*. Platen 10' is very similar in construction to platen 10, and includes a support frame 12' holding an RTV die 14' with an inner face 16'. Platen 10', like platen 10, also includes an air distribution manifold 24' to distribute air from an intake tube 26' to a number of air jets 22'. In contrast to platen 10, the air jets in platen 10' are not directly connected to the air distribution manifold. Rather, air jets 22' vent hot air from a plenum box 27' into which air distribution manifold 24' injects hot air.

The plenum box functions to equalize the pressure supplied to each of the air jets better than the air manifold alone. In order to maximize this effect, air distribution manifold 24' injects air into plenum 27' through ports 29' which face the side of plenum 27' opposite air jets 22'. Equalized pressure is critical to efficient heating of the thermoactive binder and to the elimination of cold or unbound spots in the final product. The plenum box also allows the jets to be much more evenly distributed over the surface of the press charge.

A number of supports 31' are used to stabilize the air distribution manifold 24' within plenum 27'. Retainers 33', distributed on the outside surface of plenum 27', secure the RTV material to the plenum. In addition, braces 35' are provided between the opposite sides of plenum 27' to prevent ballooning of the plenum when hot air is injected under pressure.

Figure 1E:
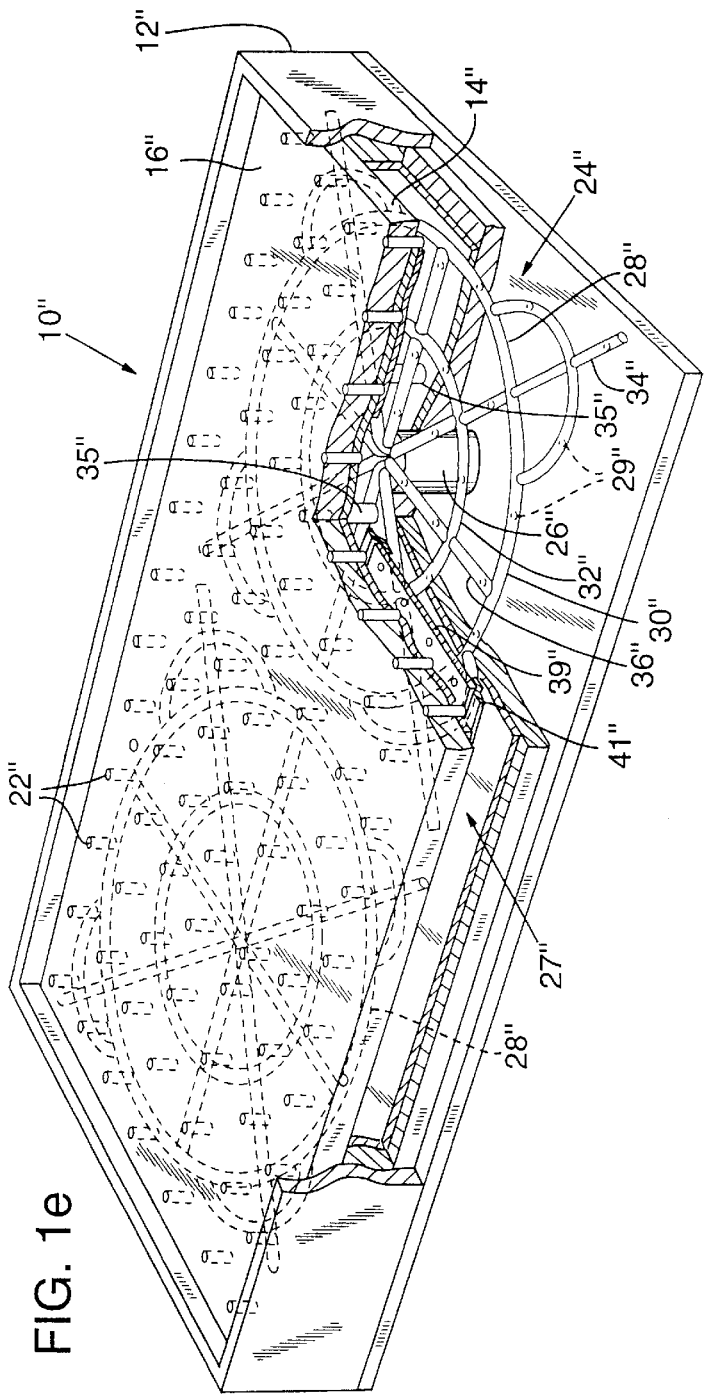

A second alternative embodiment of the platens described above is shown generally at 10" in FIGS. 1*e–f*. Overall, platen 10" is similar in construction to platen 10', although substantially larger, and includes a support frame 12" holding an RTV die 14" with an inner face 16". Platen 10", like platen 10', includes an air distribution manifold 24" to distribute air from an intake tube 26" to a number of air jets 22" within a plenum box 27". Manifold 24" includes additional tubing extending into the corners to deliver the hot air, which exits through ports 29" on the back side of the tubing, more uniformly within the plenum.

Platen 10" also includes a number of supports 31" to stabilize the manifold within the plenum. The RTV surrounding plenum 27" is secured thereto by a plurality of retainers distributed on the outside surface of the plenum adjacent inner face 16". Plenum 27" is prevented from ballooning by braces 35" which extend between the opposite surfaces of the plenum and hold them together.

Figure 9A:
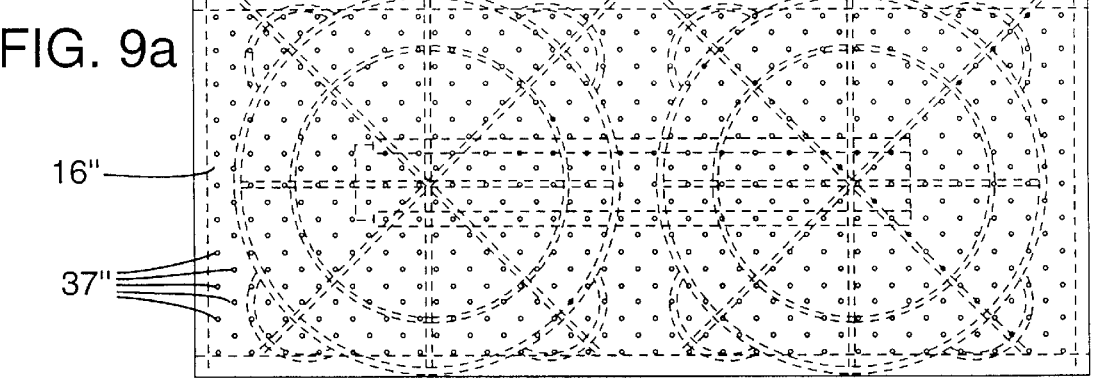
FIGS. 9a–c illustrate the various patterns of active air jets selectable by using the plate of FIG. 8.

The primary difference between platen 10' and platen 10" is the capability of platen 10" to vary the pattern of air jets 22" on inner face 16". Jets 22" on inner face 16" are arranged in a number of rows 37". See FIG. 9*a*. Within each row the jets are separated by two inches and the rows are separated by one inch. In addition, the jets in adjacent rows are offset by one inch along the length of the row.

Figure 1G:
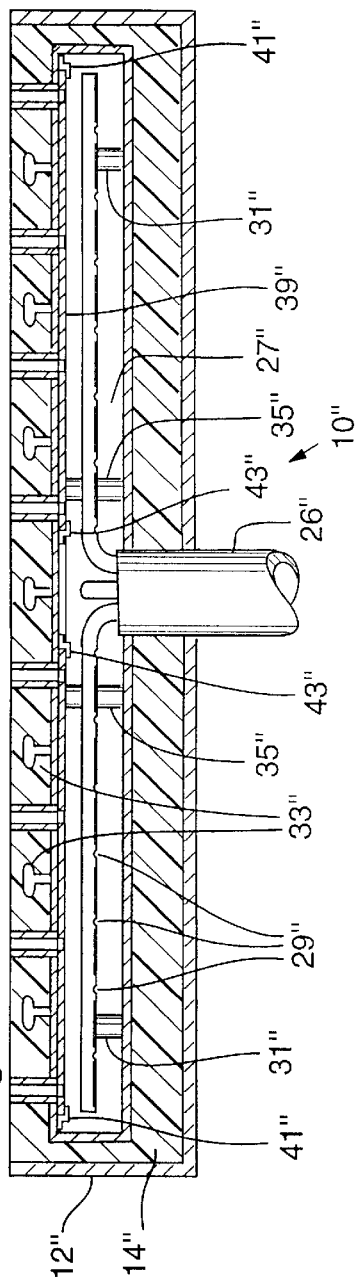
Figure 1F:
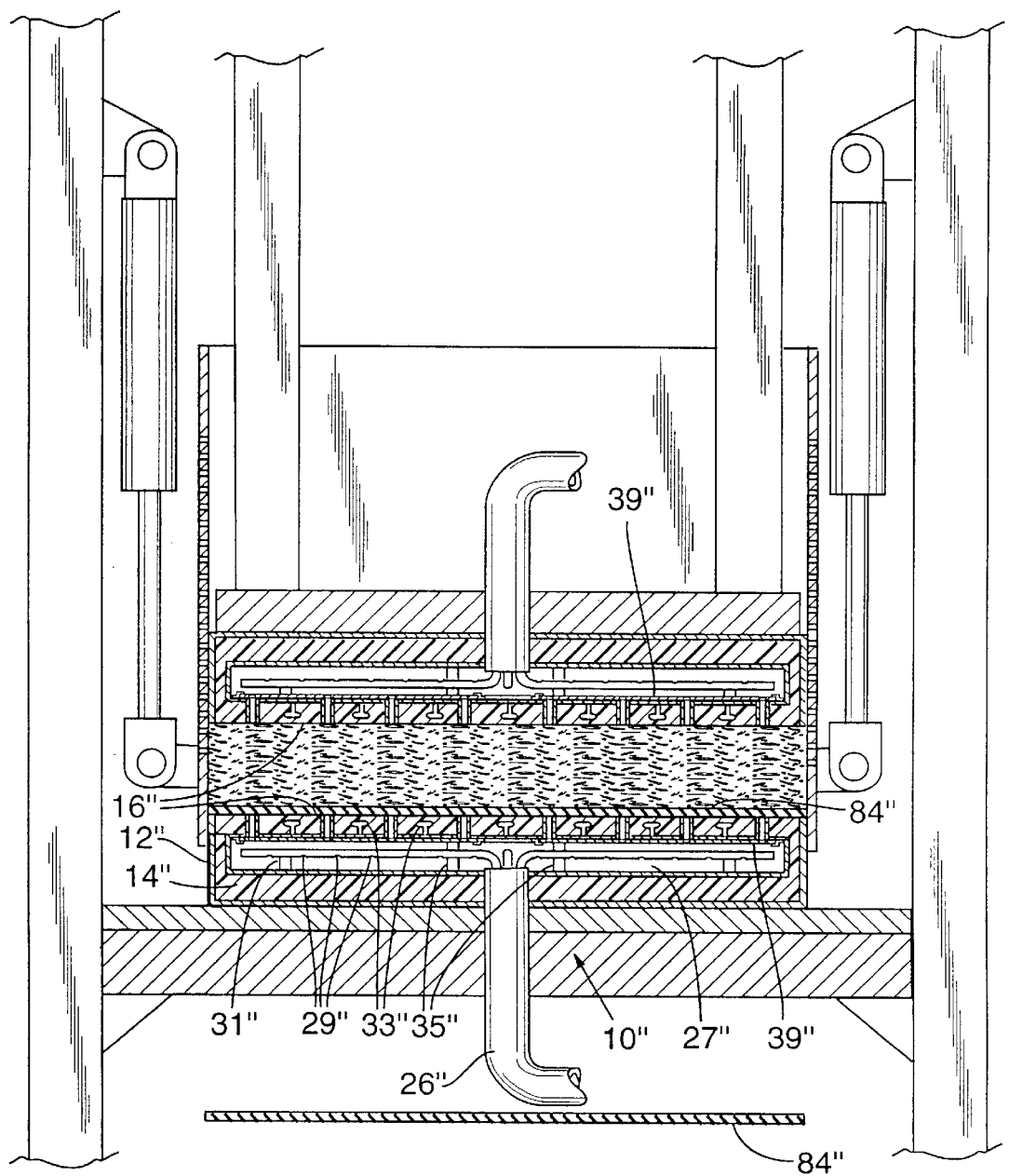

As shown in FIG. 1*f*, a sliding control plate 39" is disposed within plenum box 27", just behind inner face 16". Plate 39" slides back and forth along the long axis of platen 10" alternatively to block and open various patterns of jets 22". A support track 41" is secured to the plenum box at each lateral edge to hold plate 39" against the surface of the plenum box. A pair of internal support tracks 43" engage the edges of a central cutout 45" in plate 39" further to secure the plate.

Figure 8:
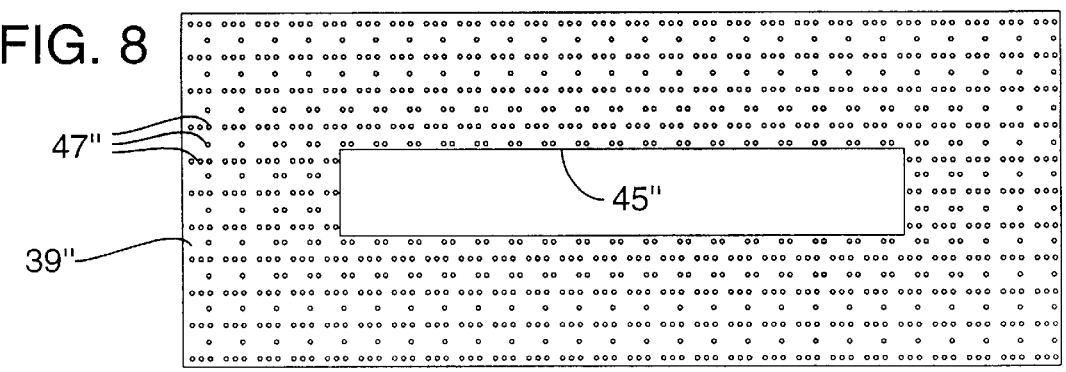
FIG. 8 shows a plate for use with the platen of FIGS. 1e–g to allow selection of the pattern of active air jets on the platen.
Figure 9B:
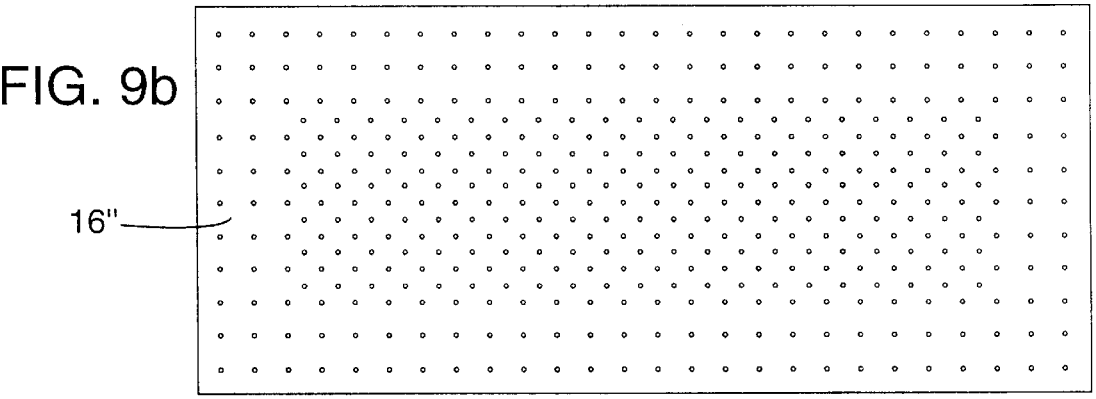
Figure 9C:
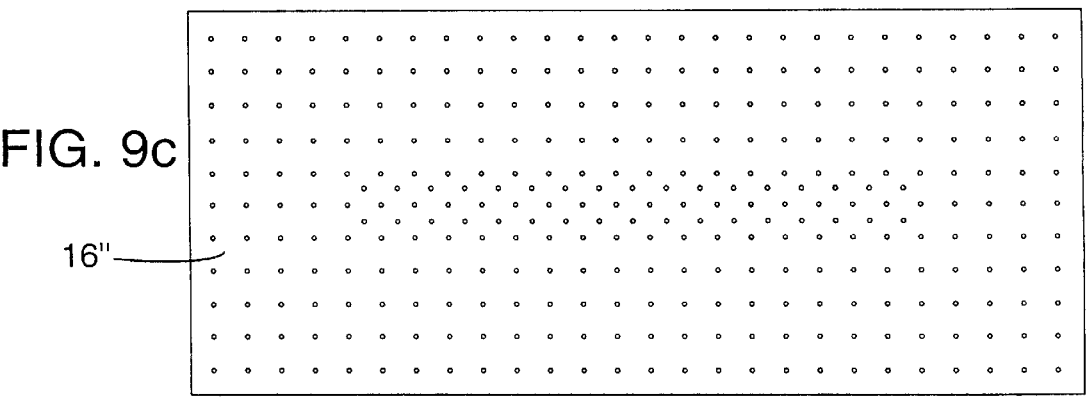

Plate 39" is designed to take on three positions behind inner face 16" and includes a pattern of holes 47" as shown in FIG. 8, that block and open various jets in each of the three positions. In the first position, holes in plate 39" are disposed behind each of the jets on inner face 16". See FIG. 9*a*. This is the full open position and plate 39" has no effect on the distribution of active air jets. In the second position, the holes in the second and fourth row in from each edge are blocked, thereby reducing the air flow near the edges. See FIG. 9*b*. Similarly, in the third position, the holes in the second, fourth, sixth and eighth rows in from each edge are blocked, further reducing the air flow near the edges. See FIG. 9*c*.

Hot air injected near the edges of the platen tends to escape without imparting its heat to the press charge. It is therefore desirable to reduce air flow near the edges of the platen to improve the efficiency of the pressing process. Use of plate 39" to regulate the air flow near the edges of the platen allows the air flow to be adjusted as necessary to obtain optimal heat transfer and efficiency.

RTV rubber is used to form the dies in the preferred embodiments because of its low coefficient of thermal conductivity. The thermal insulation provided by the use of RTV rubber in dies is preferred because of the reduced heat transfer to the platens during air injection and compression. Metal dies, for instance, would probably need to be preheated or they would absorb a significant amount of heat from the press charge and hot air, thereby reducing the energy efficiency of the process and increasing the time needed to heat the press charge. In addition, if the dies absorb too much heat they might need to be cooled prior to the next pressing cycle, further extending the cycle time. The use of RTV rubber also reduces heat transmission from the manifolds, and therefore the hot air, to the platens, increasing the temperature at which the air exits the jets. Thus, use of an insulating material in the preferred embodiment results in a highly energy efficient system for forming a composite product with a thermoactive binder because an optimal amount of the energy supplied goes to heating the press charge. As an additional benefit, it is easier to separate the RTV rubber from a press charge than it would be to separate the RTV rubber from a metal die.

Although RTV rubber is preferred, it is anticipated that a number of other materials could be used to make a suitable form. In particular, any material with a low coefficient of thermal conductivity and the ability to be formed into a shape over the air jets should be acceptable. Thermoset plastics and thermoplastics with a high melting temperatures might work, as well as ceramics or perhaps even concrete. As mentioned above, it is desirable to have the product easily separate from the surface of the platen. Certain materials that have the other desirable physical properties for use in a die but which would not easily separate from the press charge, might work if provided with a coating, such as Teflon or Mylar, to facilitate separation of the product from the die.

One distinction between the present invention and prior art presses is the elimination of the requirement that the platens be heated during the pressing step. As discussed above, in the previously known methods of forming composite products such as particle or wafer board, the platen surfaces that contact the press charge are always heated. Even in presses that use steam to provide heat to the press charge, the platens must nonetheless be heated to avoid excessive heat absorption and condensation of the steam on the platens. The present invented method and apparatus avoid excessive heat absorption by using an insulating material to contact the press charge. Condensation is also not a problem when using a dry or non-condensable gas to supply the heat, as per the present invention.

Platen Press

Figure 2:
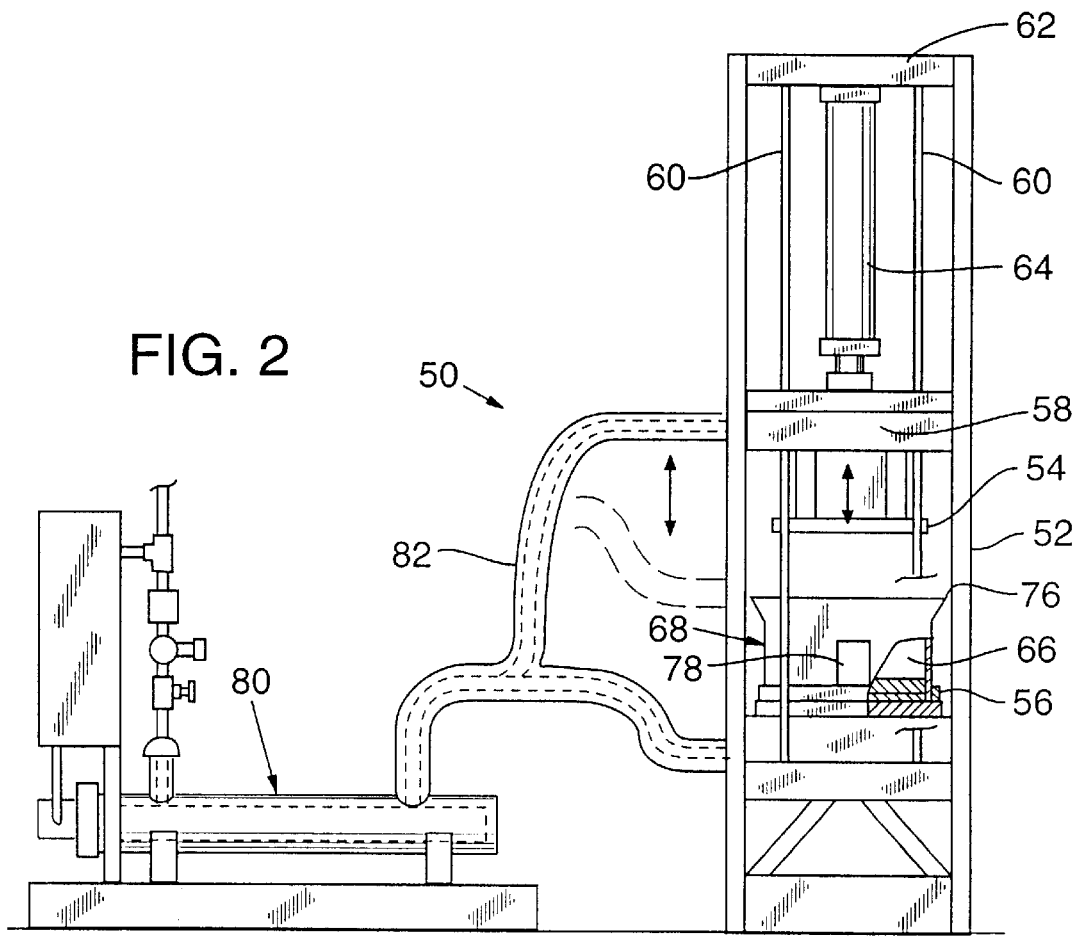
FIG. 2 shows a platen press adapted to use platens of the type shown in FIGS. 1a–f and inject a hot gas into a press charge.

A hot-air press according to the present invention is shown generally at 50 in FIG. 2. Press 50 includes a frame 52, and upper and lower platens 54, 56. The platens are made generally according to the above description. Lower platen 56 is stationary and fixed to frame 52 at the bottom. Upper platen 54 is moveable and disposed above lower platen 56 within frame 52.

A carrier 58, to which upper platen 54 is mounted, is guided on four rods 60 that form part of frame 52. Rods 60 are attached to frame 52 near lower platen 56 at one end and to a top member 62 at the other. A hydraulic cylinder 64 extends between top member 62 and carrier 58 to urge upper platen 54 down towards lower platen 56 during the pressing process. Cylinder 64 also raises upper platen 54 after the pressing process is complete.

Figure 5A:
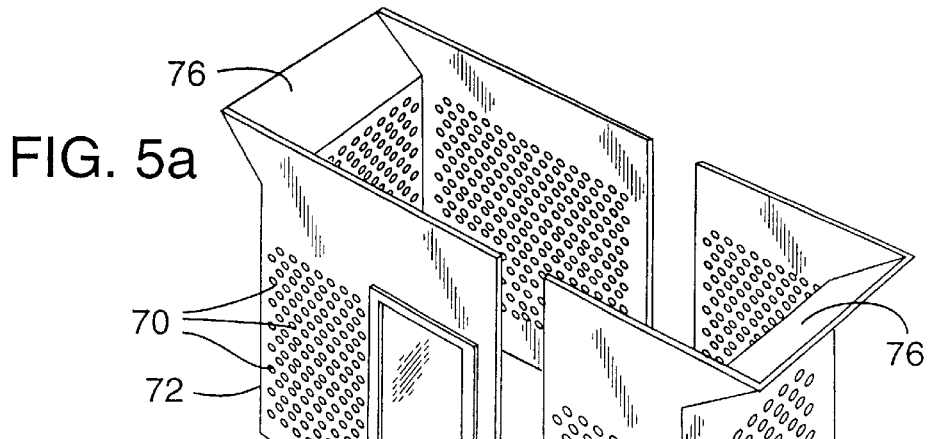
FIGS. 5a–b show two containment shells for use with the presses of FIGS. 2, 3a and 3b.

A compression chamber 66 is bounded on the top and bottom ends by upper and lower platens 54, 56. Compression chamber 66 is further bordered on the sides by a containment shell 68. See FIG. 5a. Containment shell 68 engages, and is removably fixed to, the frame of lower platen 56 and extends upwardly therefrom to closely surround the perimeter of upper platen 54. Upper platen 54 can slide up and down within containment shell 68, which is formed of thin sheet metal perforated with a plurality of 1/32 and 1/16 inch holes 70 It is anticipated that containment shell 68 would preferably be constructed of some material having a low coefficient of thermal conductivity to reduce heat absorption from the hot air and press charge. Possible materials include, but are not limited to, those listed above for constructing the dies, as well as perforated metal sheeting coated with some insulating material. Since the containment shell preferably provides the escape route for the hot air, it should be formed of an inherently porous material or a material that may be perforated with a number of holes.

Containment shell 68 is split along a vertical plane into a first portion 72 and a second portion 74 for easy removal. Each portion 72, 74 includes an outwardly extending mouth 76, proximal to the upper end, through which material is fed into the compression chamber 66. First portion 72 further includes a vertically oriented transparent portal 78 through which the progress of the pressing process may be observed.

Containment shell 68 is beneficial in the present invention because of the relatively low starting density and cohesivity of the press charge. A large volume of material is required to form a small amount of end product. A typical volume compression ratio during the pressing process is on the order of 30:1. Because the press charge is quite thick to begin with, some form of confinement is preferred to keep it from spilling out over the edges of platens 54, 56.

It is anticipated that, in an industrial embodiment, material to form the press charge would likely be blown into compression chamber 66 or carried by an auger or conveyor belt, as described below, rather than being poured in through mouths 76.

A hot air circulation heater 80 heats the hot air just prior to injection into compression chamber 66, although waste heat from other industrial processes could be used as well. The hot air is carried by insulated tubing 82 from heater 80 to the air intakes on platens 54, 56. Because of flow constrictions between the heater and the air jets, the pressure of the hot gas at the air jets is typically somewhat lower than the pressure at the air circulation heater.

Alternative Platen Press

Figure 3A:
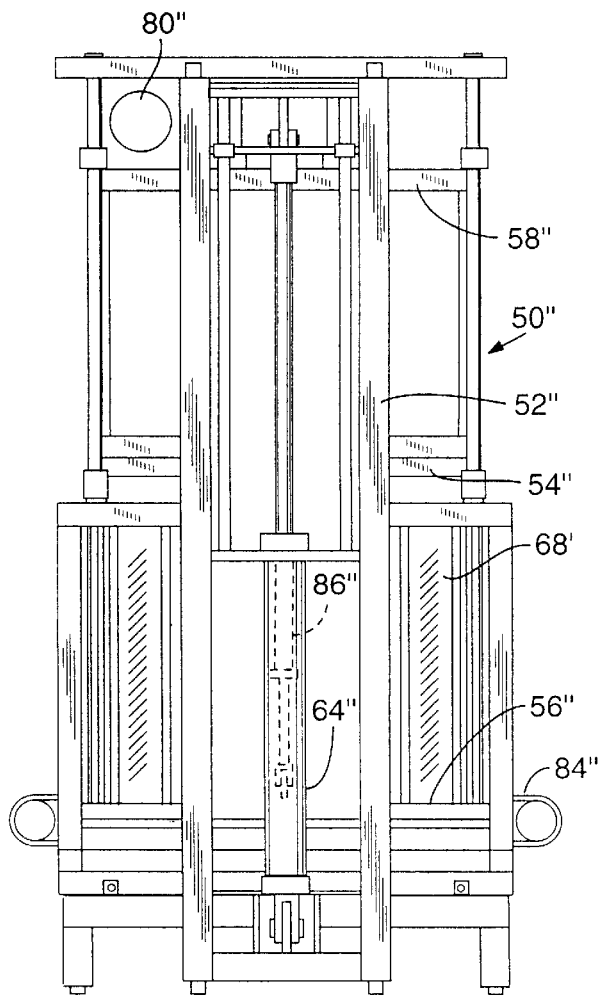
FIGS. 3a–b show side and end views of a variation of the platen press of FIG. 2.
Figure 3B:
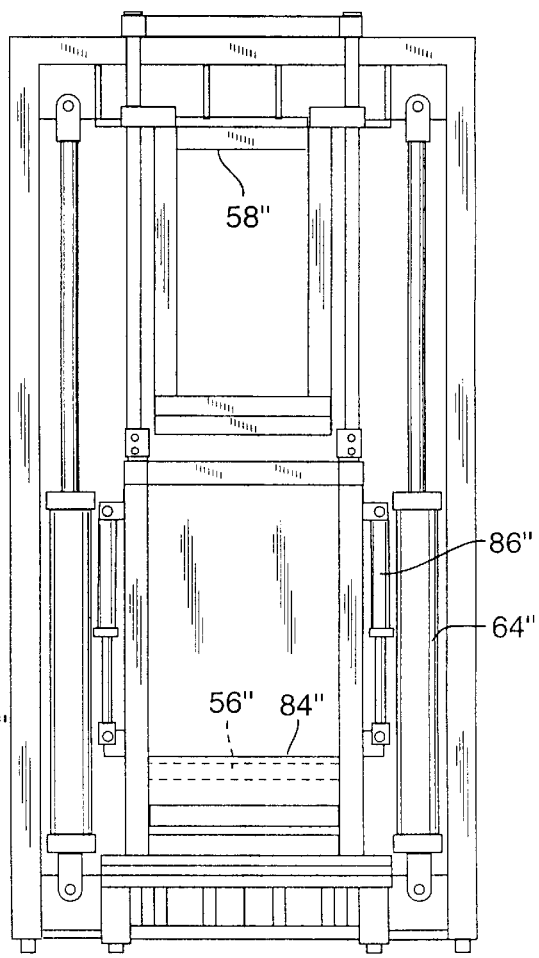

An alternative embodiment of a hot air press according to the present invention is shown generally at 50" in FIGS. 3a–b. Press 50" includes a frame 52" and upper and lower platens 54" and 56". Upper and lower platens 54", 56" are of the type shown at 10" in FIGS. 1e–g. Upper platen 56" is mounted to a carrier 58" which is driven up and down by hydraulic cylinders 64". A compression chamber 66" is bounded on the top and bottom by platens 54" and 56" and is surrounded on the edges by a containment shell 68".

Figure 5B:
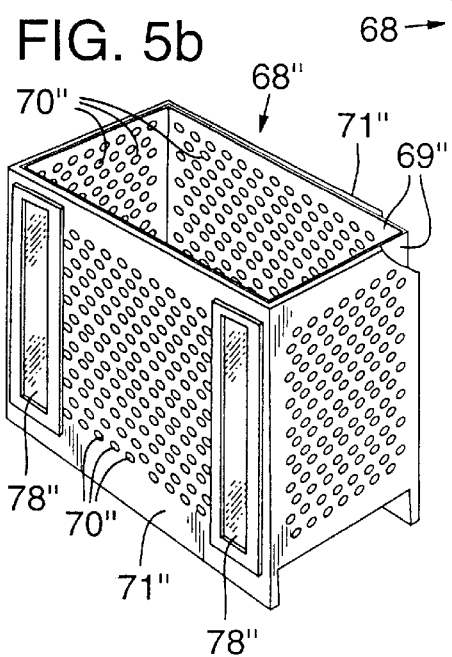

Containment shell 68" is used with press 50" to contain the press charge. Shell 68" is a four-sided box sized to fit closely about upper platen 54" while allowing it to move up and down within the shell. See FIG. 5b. The sides of shell 68" are formed of one-eighth inch thick teflon sheets 69" perforated with a large number of one-eighth inch holes 70". In the drawings, the relative size of the holes is exaggerated and the number of the holes is much greater than what is shown. An outer shell of sheet metal 71" is riveted to the outside of teflon sheets 69". Sheet metal 71" includes one-sixteenth inch holes overlying the holes in the teflon sheet. The smaller holes are used in the sheet metal to prevent small particles from being blown out of the compression chamber when the hot air is injected. Ideally the holes in the teflon sheets should be smaller as well, although the maximum acceptable size would be determined by the size of particles used in the press charge. Containment shell 68" further includes windows 78" disposed at the edges of the long side to allow the press operator to observe the progress of the pressing process.

The air for each platen is heated with a separate air circulation heaters 80". Heater 80" for upper platen 54" is mounted to carrier 58" so that it moves up and down with the platen. This eliminates the need for flexible tubes as shown in hot air press 50. Such tubes are susceptible to failure when they flex because of the high temperatures and pressures to which they are subjected. By mounting the heater in a fixed relationship with the platen, only cold air needs be ducted by a flexible tube.

Press 50" may be loaded by either of two methods. In order to prepare for loading the upper platen 56" is raised six to eight inches above the top of containment shell 68". Then, in the first method, a simple vacuum/blower may be used to suck up the material to form the press charge and blow it into compression chamber 66". Alternatively, a conveyor 83" may be used to deliver the material. See FIG. 10a. Conveyor 83" would move both side-to-side and front-to-back across the compression chamber to load the material evenly therein.

To automate the removal of press charges, hot air press 50" includes an open mesh conveyor belt 84" which extends across inner face of lower platen 54". Belt 84" does not affect the operation of press 50" until after the first pressing stage, as described below, is complete. Because belt 84" is open mesh, the hot air passing through the jets in lower platen 54" continues unimpeded through belt 84". However, when the first pressing stage is complete, containment shell 68" is raised slightly by hydraulic cylinder 86" and belt 84" is engaged to carry the press charge out of the press.

Consolidation press

Figure 4A:
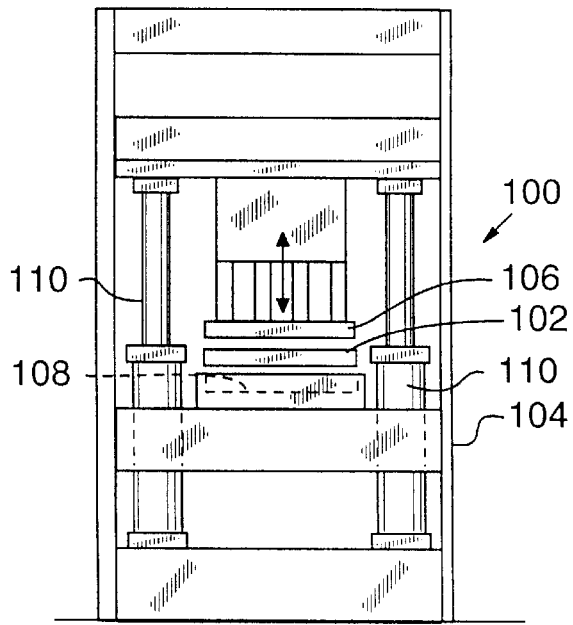
FIGS. 4a–c show three alternative embodiments of a consolidation press for use with the platen presses of FIGS. 2, 3a and 3b.

In the preferred embodiment, a consolidation press 100, as shown in FIG. 4a, is used in conjunction with hot air press 50. After a press charge 102 has been heated and preformed in the hot air press, consolidation press 100 further compresses the press charge to create the final product. Consolidation press 100 includes a frame 104, and upper and lower platens 106, 108. Lower platen 108 is fixed to frame 104 and upper platen 106 is disposed over lower platen 108 and connected to the upper portion of the frame through a pair of hydraulic cylinders 110. Hydraulic cylinders 110 drive upper platen 106 down towards lower platen 108. In general, consolidation press 100 is relatively similar in structure to hot-air press 50, but is substantially more massive to accommodate the higher pressures required.

Figure 4B:
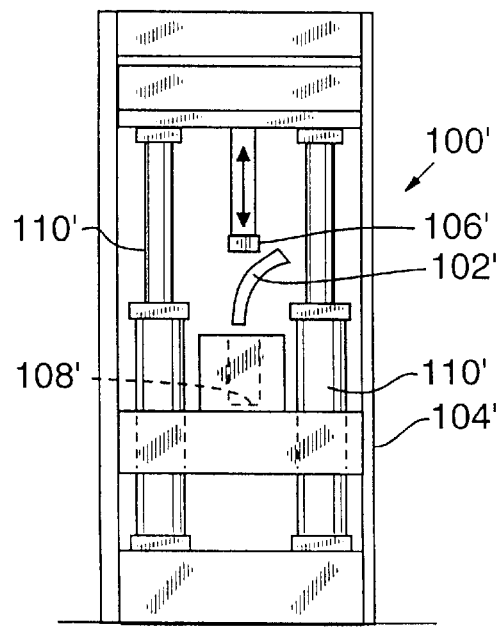

Consolidation press 100 is used to create flat panel-like products. An alternative consolidation press 100' is used to produce blocks rather than flat panels from a press charge 102'. See FIG. 4b. If formed parts are desired, the platens in either press 100 or 100' could be supplied with protrusions of voids to shape the part as desired. Consolidation press 100', like consolidation press 100, includes a frame 104', and upper and lower platens 106', 108'. Lower platen 108' is fixed to frame 104' and upper platen 106' is disposed over lower platen 108' and connected to the upper portion of the frame by a hydraulic cylinder 110'. Hydraulic cylinder 110' drives upper platen 106' down toward and into lower platen 108'. The press charge, as it comes from the hot air press is relatively flat and planar. In consolidation press 100 the press charge is pressed along the same, flat dimension to produce a flat panel. In consolidation press 100', in contrast, press charge 102' is placed in lower platen 108' on edge and the surface area of the platens is several times smaller that the corresponding surface area of the hot air platens. Thus when press charge 102' is pressed in consolidation press 100', the result is a narrow thick block rather than a wide thin panel.

Figure 4C:
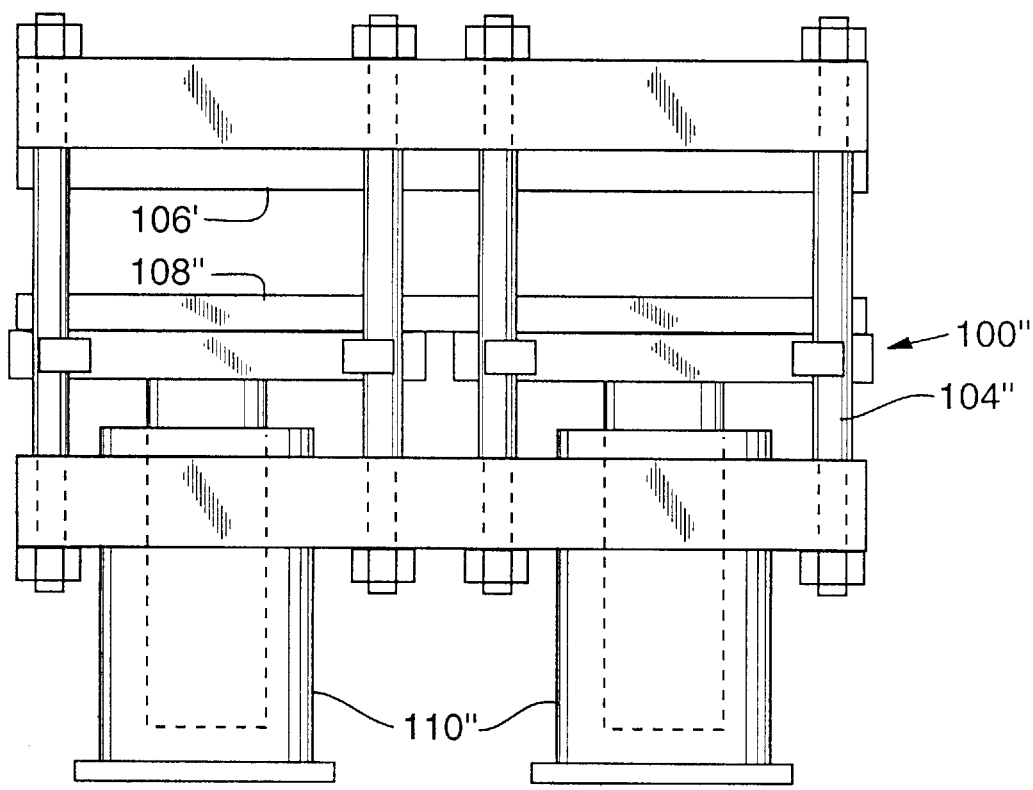

FIG. 4c shows a second alternative embodiment of a consolidation press 100" according to the present invention.

Consolidation press 100" is designed to work with hot air press 50" so that a press charge 102" can be automatically transferred between the presses. Consolidation press 100" is similar to press 100 and includes upper and lower platens 106", 108". Platens 106" and 108" include a number of internal channels and are actively cooled by running a chilled liquid through those channels. Preferably the liquid should be chilled to about 20° F. and would consist of water mixed with some type of antifreeze.

Other than the platens, the primary difference between consolidation press 100 and consolidation press 100" is the use of an associated transfer conveyor 120" to load preformed press charges 102" and unload the finished product from the consolidation press. See FIGS. 10c. Conveyor 120" includes a standard endless belt that rotates to move the press charge relative to the conveyor. Additionally conveyor 120" is articulated so that it can move as a whole in and out of consolidation press 100".

Figure 10B:
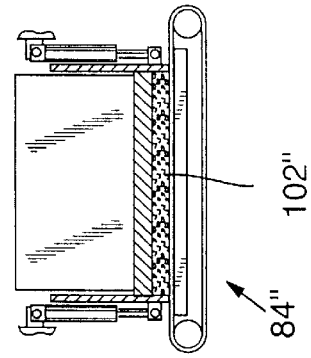
FIGS. 10a–f show the automated process of transferring a press charge from the press of FIGS. 3a–b to the press of FIG. 4c.
Figure 10A:
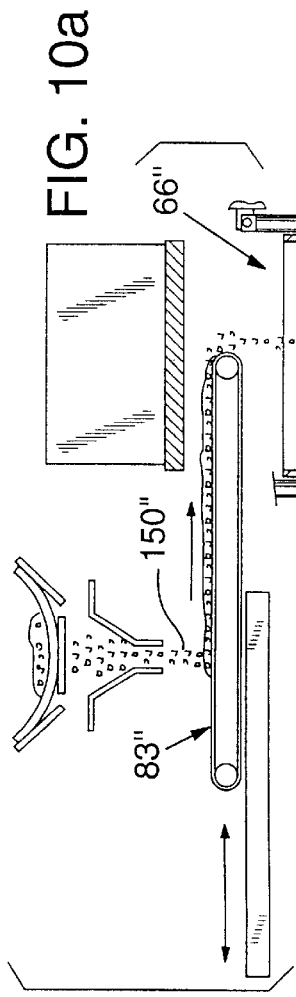
Figure 10D:
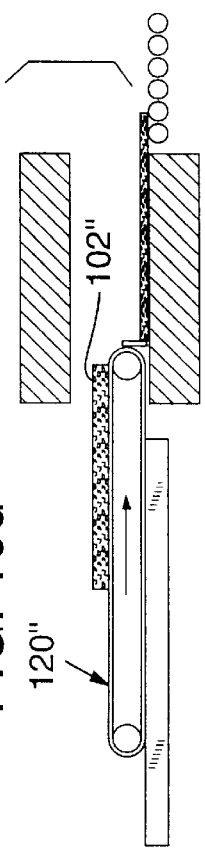
Figure 10F:
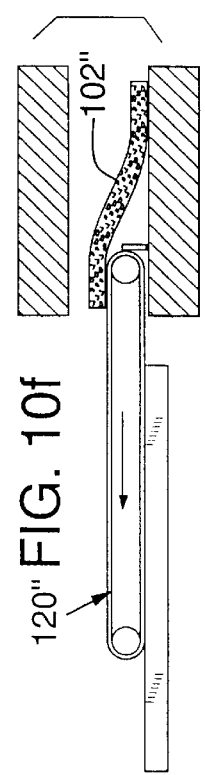
Figure 10C:
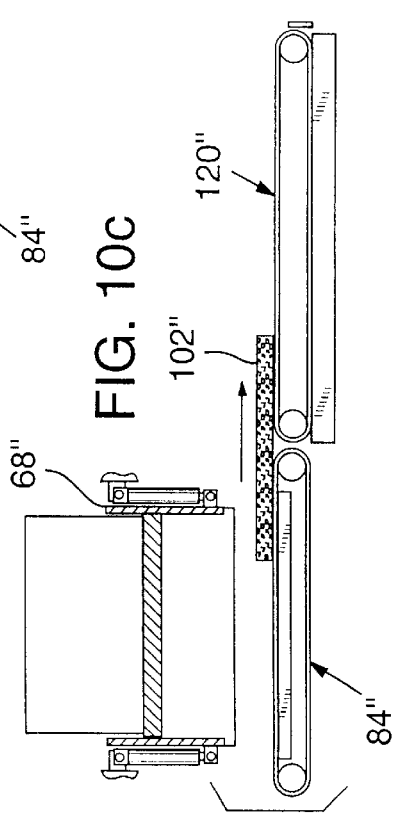
Figure 10E:
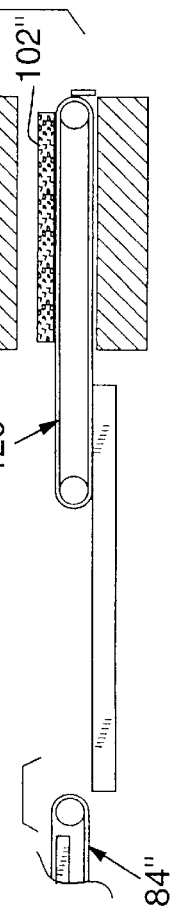

The procedure by which the press charge is created and transferred from hot air press 50" to consolidation press 100" is shown schematically in FIGS. 10a–10f. As shown in FIG. 10a, a base material 150" is added to the compression chamber by a loading conveyor 83". As discussed above, loading conveyor moves side-to-side and from back-to-front to distribute evenly the base material to form press charge 102". After press charge 102" is preformed in compression chamber 66", as shown in FIG. 10b, containment shell 68" is raised slightly to create room for the press charge to slide out of the hot air press. With the upstream end of conveyor 120" adjacent to the downstream end of conveyor 84" and the belts running on both conveyors, the preformed press charge is carried out of the hot air press and onto conveyor 120". See FIG. 10c. If necessary, an oven may be used to maintain the temperature of the press charge between the presses. Once the press charge is in place on conveyor 120", the conveyor is moved into consolidation press 100" between the platens. See FIGS. 10d–e. As the conveyor is moved into consolidation press 100", the leading edge engages prior panel that has completed it's cycle, and pushes it out. After conveyor 120" is positioned between the platens, the belt is restarted and the preformed press charge 102" is conveyed off the end of conveyor 120". See FIG. 10f. Simultaneously, conveyor 120" is drawn back out of the press to leave just the press charge sitting between the platens.

Although not required, a two stage pressing process is preferred in the present invention, at least for thermoplastic binders, for several reasons. First, the cycle time is reduced because the next press charge can be heating while the previous charge is cooling in the consolidation press. Second, for press charges composed of materials that are flowable or become so when heated, applying high pressures in hot air press 50 may cause material to flow into and clog the air jets. In addition, the two stage process saves energy over an equivalent single step process since it is not necessary to heat and cool the platens in the hot-air press, as would be typically be required to form thermoplastic composites.

In contrast to the preferred method for thermoplastic binders, for thermoset binders, it is anticipated that the preferred method would use only a single press with heated platens. With thermoset binders, it is not necessary to cool the press charge prior to removal since the binder solidifies, i.e. polymerizes, prior to cooling. Thermoplastics, on the other hand, do not solidify until they are cooled.

It should be noted that, although a dry or non-condensable gas is preferred in the two stage pressing process, it is not limited to such gasses and may be used with steam as the heat-transfer medium as well.

Another important consideration is the difference in the desired thermal conductivity properties of the hot air platens versus the platens in the consolidation press. In the hot air stage it is important that the platen not absorb heat from the hot air or base material. During the cooling stage, in contrast, it is desirable to maximize the transmission of heat from the charge to the platens so that the charge cools rapidly. Thus it is desirable to have thermally conductive platens in the consolidation press and thermally insulative platens in the hot air press.

In an embodiment from mass production, the consolidation press platens would preferably be heated and cooled. The face of the platens in the consolidation press would be pre-heated to draw additional thermoplastic to the surface when the part is first inserted, thereby creating a smooth finish. Since only the face of the platen contacting the part needs to be heated, and then only briefly, it is anticipated that some type of thin resistance heater that could heat and cool rapidly would be placed on the faces of the platens to supply the necessary burst of heat. Such a resistance heater might be suspended on springs slightly away from the rest of the platen, creating a momentary dead-air space between the platen and the heater. This would allow the heater to supply some heat to the surface of the press charge without heating the entire body of the platen. Then, when the springs bottom out, the heater would shut off and heat would be conducted from the press charge to the platens. It is also possible to pre-heat two thin metal plates to insert in consolidation press 100 with press charge 102. The pre-heated plates achieve the same result as a resistance heater and will subsequently conduct heat away from the press charge efficiently. The platens in the consolidation press are preferably made of metal for strength, and may include protrusions and voids to shape of the final product as desired.

To reduce press cycle time in an embodiment for mass production, the platens would also be actively cooled to quickly lock the product in its final form, at least for thermoplastic binder composites, which do not stabilize until they have cooled sufficiently to solidify the binder component as discussed above.

Operation

The process will be described as adapted to a thermoplastic binder in the form of a thermoplastic fluff as described above. However, as a preliminary matter, the pressure in the presses, temperature of the gas, and time for each stage will vary according to the type and physical dimensions of the thermoactive binder being used.

Figure 6A:
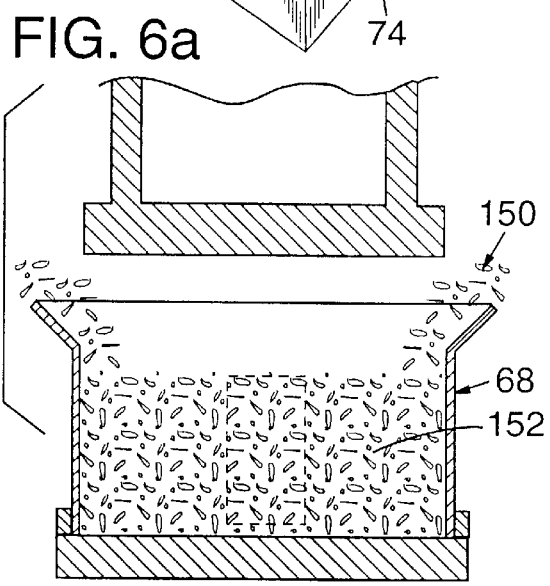
FIGS. 6a–i show the process of forming a thermoactive binder composite product in the form of a panel according to the present invention.
Figure 6B:
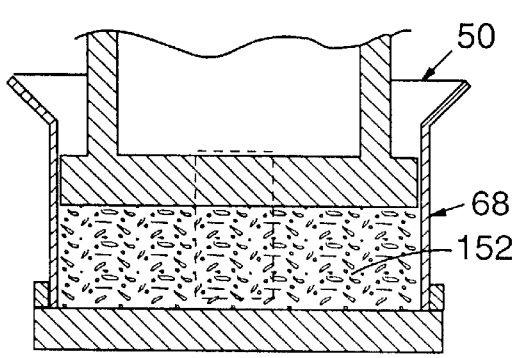

A pressing cycle, as schematically illustrated in FIGS. 6a–g, begins with the addition of base material 150 to compression chamber 66 of hot air press 50 to create a press charge 152. Upper platen 54 is then lowered to compress press charge 152 to a specific density as shown in FIG. 6b. The exact density is dictated by the available air flow, associated pressure at the jets, temperature, and size and type of thermoactive binder pieces and filler particles, as well as other considerations.

The air or other hot gas is typically compressed using a conventional air compressor and is preferably supplied to the input of circulation heater 80 at a pressure between 5 and 80 psi, although even higher pressures may be desirable in some circumstances. The exact pressure chosen equates to a desired flow rate that depends on the size of the thermoactive binder pieces, the overall permeability of the base material and the air compressor capacity. Each base material formulation has an optimal pressure/flow rate relationship that is governed by the required cycle time, the physical conformation of the binder pieces, and the stability of the mixture when subjected to air force. For dust sized binder piece/filler particle mixtures, therefore, the air is injected at relatively low pressure. If higher pressures and greater flow rates are used, the dust sized particles may be blow out of compression chamber 66 through the holes in containment shell 68 as the injected air escapes. Small particles may also become trapped in the holes in containment shell 68, thereby impeding proper air flow. A mixture of ⅛ inch thick filler particles and shredded milk bottle thermoplastic binder, on the other hand, will require a high flow rate of gas to have an acceptable cycle time and is not subject to being blown free of the compression chamber.

Figure 6C:
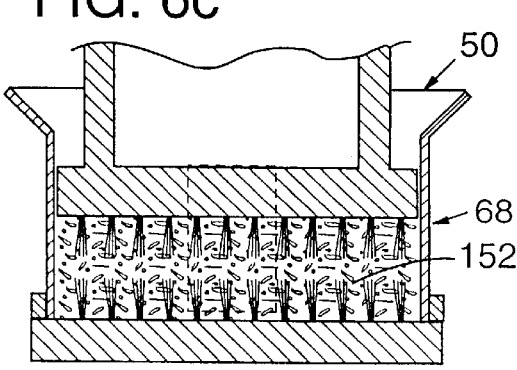
Figure 6D:
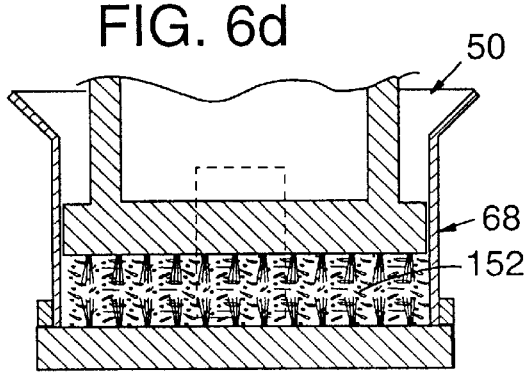
Figure 6E:
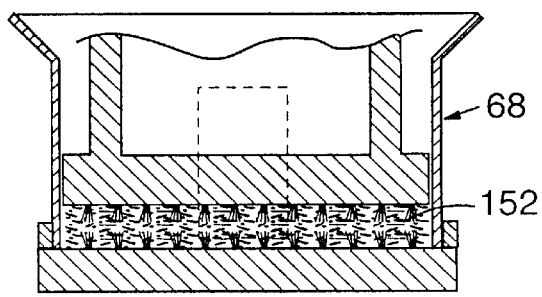
Figure 6F:
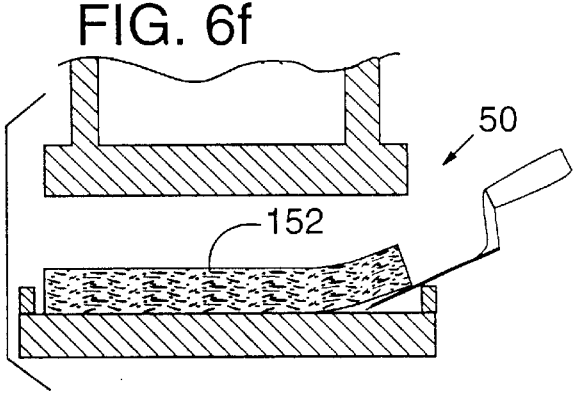
Figure 6G:
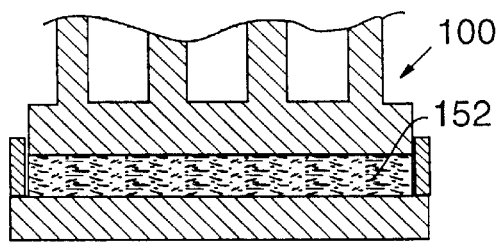

After initial compression, the hot air is injected into compression chamber 66 as shown in FIG. 6c and permeates press charge 152 to supply heat to activate the thermoactive binder component. The hot air escapes through containment shell 68. Circulation heater 80 typically raises the temperatures of the air to about 400°–500° F. Because of heat losses between heater 80 and compression chamber 66, the air will enter the compression chamber at a somewhat lower temperature. For a thermoplastic fluff made with 1/16 inch thermoplastic pieces and like sized filler particles, the air pressure at the input to circulation heater 80 would be around 30 psi. At that pressure, which results in about 150 CFM of air flow, it takes about three minutes to complete the hot air pressing portion of the cycle to create a ½ inch board.

Increasing the flow rate of hot air reduces the time required time to activate the binder. The activation time is limited by the tolerance of smaller particles to receive the air without blowing around in and out of the compression chamber and by the maximum heat transfer rate from the air to the binder pieces. For dust size particles, for instance, pressures are generally in the range of 5–10 psi. With more typical fluff, at densities of 1–3 pounds/ft³ (pcf), pressures of 30–80 psi are used. Higher density mixes, in the range of 5–15 pcf, may require even higher pressures and flow rates.

The cycle time and overall energy efficiency can be reduced by pre-heating the thermoactive binder component. By pre-heating the binder component prior to placing it in the compression chamber, less hot air will be required to subsequently raise it to the activation temperature. Likewise, pre-heating the binder component prior to mixing with any filler component reduces the energy absorbed by the filler. Energy absorbed by the filler is wasted and increases the time required to cool the final product which is important in the case of thermoplastic binders,. Thermoplastics, for instance, can be beneficially pre-heated to 250°–300° F. prior to mixing with filler particles to reduce the cycle time.

To alleviate the formation of a cold spot at the vertical center of the press charge where the hot air from the upper and lower platens meet, it is desirable to pulsate the air pressure in the platens. The pressure should be pulsated out of phase in the platens so that the pressure at the jets in the upper platen reaches maximum as the corresponding pressure in the lower platens reaches its minimum. This causes the cold spot where the two air streams meet to move up and down in the press charge. A pressure variation on the order of 20% between the platens seems to be sufficient to correct the condition.

As the thermoplastic begins to melt, and press charge 152 starts to settle, upper platen 54 is brought down maintain contact between the platen and the upper surface of the press charge. See FIGS. 6c–e. The settling of press charge 152 is observed through transparent portal 78 to enable the operator to lower upper platen 54 at the proper rate to maintain the desired contact between platen and press charge. This insures that the hot air passes through press charge 152, rather than escaping directly through containment shell 68. For a typical light fluff (1–5 pcf) base material and a three minute cycle time, the closure rate is about 5 inches per minute and the applied platen pressure is generally less than 20 psi. When the bulk of the thermoplastic component has melted, pressure is applied with upper platen 54 to compress press charge 152 slightly. See FIG. 6e.

Press charge 152 is only lightly pressed to the approximate form of the final product in the hot air press. This reduces the tendency of the flowing thermoplastic to clog the air jets. In addition, the RTV dies in the platens are not sufficiently rigid to withstand the high pressures required to finish compressing the product. Since a significant amount of air is trapped in small pockets in the lightly pressed press charge 152, it does not cool as quickly as it would if the air were forced out.

A number of modifications can be made to the above described portion of the present invention to reduce the amount of air and time required to complete the hot-air stage of pressing. First, the temperature of the hot air injected into the press charge can be spiked when the air is first applied. Spiking the initial temperature of the air to 580° F. can significantly reduce the cycle time. Even though the air temperature may briefly exceed the combustion temperature of cellulose, combustion does not occur because the cellulose does not pick up excessive heat during the short spike.

Figure 6H:
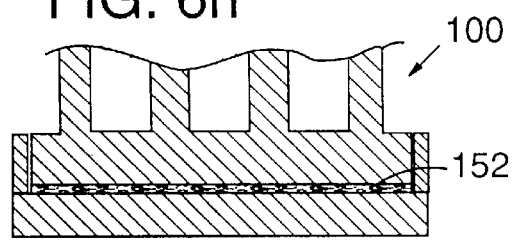
Figure 6I:
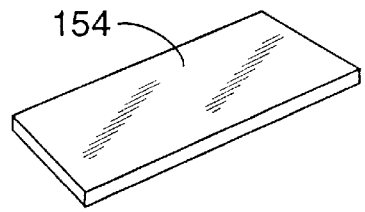

After heating in hot air press, the hot press charge 152 is transferred to the consolidation press. See FIGS. 6f–g. When press charge 152 is transferred to consolidation press 100, it is still quite pliable and several times thicker than the final product. Consolidation press 100 further compresses press charge 152 to the desired final dimensions to form the final panel-like product 154. See FIGS. 6g–I.

Figure 7C:
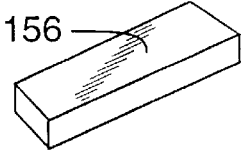
FIGS. 7a–c show a variation of the present invented process adapted to form block products.
Figure 7A:
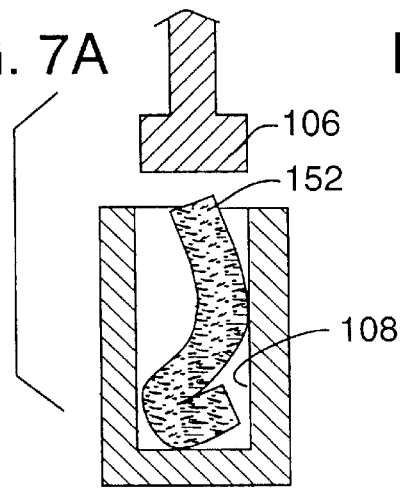
Figure 7B:
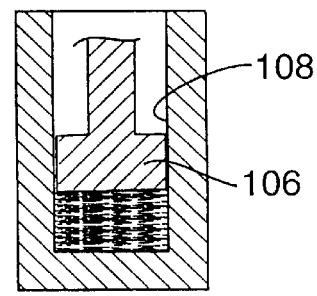

As noted above, it is possible carry out the final pressing stage on the press charge to form a flat sheet or to create a thick block. FIGS. 7a–b illustrate the use of consolidation press 100' to form a final product in the form of a block 156. The press charge is place in consolidation press 100' on edge and reshaped during the compression into block 156. See FIG. 7c. In an embodiment mass production of thicker products such as block 156, the thickness of the press charge would be increased to provide additional thickness in the final product, rather than pressing the press charge from an end or side in the consolidation press as shown.

The surface pressure applied to the press charge in consolidation press 100 ranges from 100–1000 psi, with 500 psi being rather typical. By choosing an appropriate pressure in the consolidation press it is possible to create products having widely varying densities. Using a low pressure and fairly large filler particles results in a low density filler suitable for use a door core or other similar purposes. Higher pressures and smaller particles generate a composite product very similar to particle board in density and appearance.

The pressure in consolidation press 100 is maintained until the part is sufficiently cooled to hold its shape, at which point the part is removed and process is complete. See FIG. 6i. If the part is removed from consolidation press 100 before the center has solidified, the internal stresses may cause the part to swell and split. If desired, the final product can be embossed with a simulated wood grain or other pattern in the consolidation press. In addition, a surface layer of paper, vinyl or other material can be applied in the consolidation press.

The following table specifies the actual values of the various parameters for particular thermoplastic/cellulose composite product.

TABLE 1

| Cellulose Flake Characteristics: | |
| --- | --- |
| Thickness = | 0.035 inches |
| Length = | 1.5–2.5 inches |
| Species = | Southern Pine |
| Moisture Content = | 14% |
| Bulk Density = | 4.5 pcf |
| Thermoplastic Characteristics: | |
| Type = | Expanded Polyethylene |
| Compressed Thickness = | 0.030 inches |
| Bulk Density = | 2 pcf |
| Base Material Characteristics | |
| Cellulose Weight = | 1.4 lb |
| Plastic Weight = | 1.4 lb |
| Uncompressed Bulk Density = | 2.75 pcf |
| Uncompressed Thickness = | 8 inches |
| Precompressed Bulk Density* = | 6.57 pcf |
| Precompressed Thickness* = | 4 inches |
| Hot Air Press: | |
| Ambient Temperature = | 68° |
| Air Temperature in Plenum = | 450° |
| Air Pressure in Plenum = | 10 psi |
| Air Flow = | 150 cfm |
| Press Time = | 114 seconds |
| Platen Pressure = | |
| Final Thickness = | 1.25 |
| Final Density = | |
| Consolidation Press | |
| Time = | 180 seconds |
| Initial Platen Temperature = | 78° F. |
| Platen Pressure = | 350 psi surface pressure |
| Final Platen Temperature = | 118° F. |
| Finished Product: | |
| Density = | 44.2 pcf |
| Thickness = | 0.6 inches |
| Size = | 9.5 × 19 inches |

*at time of air injection

The example specified in Table 1 was created using a hot air press, such as press 50, with platens such as platens 10'. The consolidation step was carried out with a consolidation press such as press 100.

It is anticipated that the method and apparatus of the present invention are suitable for use in forming thermoactive binder composite products listed in Table 2, below.

TABLE 2

1. Siding (lap siding, panelized, batten stock)
2. Soffit panels
3. Fascia
4. Exterior and interior trim mouldings
5. Redwood equivalent gutter stock
6. Decking (four square, T&G, etc.)
7. Post and railing lumber
8. Exterior and interior step treads
9. Roof shakes
10. Shingles, especially thick edge
11. Flush and paneled exterior doors (rails, stiles, cores, composites, etc.)
12. Window sills and frames
13. Exterior/interior door frames
14. Interior moulding/millwork shapes
15. Wet and dry area underlayment

TABLE 2-continued

16. Counter top stock
17. Sill plate lumber
18. Interior flush door cores (20–25 pound density)
19. Landscaping timbers
20. Fence and rail stock (four-square or hand-split look)
21. Exterior and interior nonstructural panels (dog house, storage shed, etc.)
22. Interior flooring, wet or dry area (plank, square, parquetry etc.)
23. Build-in cabinets
24. Truck decking
25. Shelving and table tops
26. Games, toys
27. Formed backs/baffles
28. Seat bottoms
29. Agricultural boxes and bins
30. Performed wall panels It will now be clear that an improvement in this art has been provided which accomplishes the objectives heretofore set forth. While the invention has been disclosed in its preferred form, it is to be understood that the specific embodiment thereof as disclosed and illustrated herein is not to be considered in a limited sense as there may be other forms or modifications which should also be construed to come within the scope of the appended claims.

I claim:

1. A method of forming a thermoactive binder composite product comprising the steps of:
   choosing a base material including a thermoactive binder component;
   forming the base material into a mat having at least one surface expanse;
   providing jet structure for delivering a pressurized hot non-condensable gas toward and into the base material through the surface expanse, the jet structure including a plurality of jets adapted to be disposed in a predetermined distribution over the surface expanse with the plurality of jets having an average opening size and being spaced apart in the predetermined distribution by an average distance substantially greater than the average opening size;
   injecting, via the provided jet structure, the hot non-condensable gas into the base material, where the pressure of the gas is substantially dissipated in passage through the jets prior to entry into the base material at least during a portion of the step of injecting; and
   pressing the base material to compress it to a first density.

2. The method of claim 1 wherein the jets are positioned in contact with the surface expanse of the base material.

3. The method of claim 2 wherein the jets are separated from the surface of the base material by a short distance.

4. The method of claim 1 further comprising the step of selecting a base material including filler particles.

5. The method of claim 4 further comprising the step of selecting filler particles generally in the form of strands.

6. The method of claim 4 further comprising the step of selecting filler particles from the group including sawdust, shredded paper, wood chips, wood shavings, peanut shells, glass fibers, boron fibers, or Kevlar™ fibers.

7. The method of claim 4 further comprising the step of preheating the thermoplastic portion of the base material prior to combination with the filler particles.

8. The method of claim 1, further including the step of forming the base material into a press charge that includes opposing sides, and wherein the providing set including providing jets positioned to deliver gas toward and into the opposing sides of the press charge.

9. A method of forming a thermoactive binder composite product comprising the steps of:
   supplying a base material including a thermoactive binder component;
   providing a platen press with a pair of opposed platens to compress a press change formed from the base material;
   choosing platens having an insulating inner face for contacting the press charge to thereby substantially limit conductive heat transfer between the platens and the press charge;
   injecting a hot dry gas into the press charge; and
   compressing the press charge.

10. The method of claim 9 further comprising the step of choosing hot air as the hot gas for the step of injecting.

11. The method of claim 10 further comprising the step of heating the hot air to between 400° and 600° F. prior to the step of injecting.

12. The method of claim 9 further comprising the step of choosing thermoplastic fluff as the thermoactive binder.

13. A method of forming a thermoactive binder composite product comprising the steps of:
   selecting a gas permeable base material including a thermoactive binder component;
   forming the base material into a press charge having a pair of opposing sides; and
   infusing a substantially dry hot gas into the base material through a first region on one of the opposing sides and through a second region on the other of the opposing sides simultaneously, with at least a substantial portion of the regions being opposed to each other across the press charge in a direction generally normal to the sides, where the temperature of the gas is greater than the activation temperature of the thermoactive binder component of the base material.

14. The method of claim 13, further including the step of providing jet structure for infusing the substantially dry hot gas toward and into the base material through the opposing sides, the jet structure including a plurality of jets disposed over both opposing sides.

15. The method of claim 14, further including the step of forcing an amount of gas through the jets sufficient to create a substantial pressure drop across the jets prior to entry of the gas into the base material.

16. A method of forming a thermoplastic binder composite product comprising the steps of:
   selecting a gas permeable base material including a thermoplastic binder component, where the gas permeability of the base material varies upon activation of the thermoplastic binder;
   injecting a substantially dry hot gas into the base material from a plurality of discrete locations, where the temperature of the gas is greater than the activation temperature of the thermoplastic binder component of the base material;
   regulating the gas flow among the plurality of discrete locations so that variations in the permeability of the base material in the proximity of one or more of the plurality of discrete locations does not substantially affect gas flow into the base material from one of the one or more discrete locations relative to another of the plurality of discrete locations.

17. The method of claim 16, further including the step of forming the base material into a press charge that includes opposing sides, and wherein the plurality of discrete locations includes locations on both opposing sides of the press charge.

18. The method of claim 17, further comprising the step of compressing the base material into a substantially compact, solid product.

19. The method of claim 18, further including the step of choosing a base material including thermoplastic material as the thermoactive binder.

20. The method of claim 18, further including the step of choosing a base material including thermoset material as the thermoactive binder.

21. The method of claim 16, further comprising the step of compressing the base material into a substantially compact, solid product.

22. The method of claim 16, further including the step of choosing a substantially dry hot gas for the step of injecting with a temperature of at least 400° F.

23. A method of forming a thermoactive binder and cellulosic composite product comprising the steps of:

selecting a gas permeable base material including a thermoactive binder component and a cellulosic component;

injecting a substantially dry hot gas into the base material where the temperature of the gas is greater than 400° F., where the gas consists essentially of air; and limiting the exposure of the base material to gas with a temperature greater than 400° F. in step of injecting to avoid combustion.

24. The method of claim 23, further comprising the step of choosing a gas temperature between 400° F. and 600° F.

25. The method of claim 23, further comprising the step of selecting a thermoplastic thermoactive binder.

26. The method of claim 23, further including the step of spiking the temperature for a predetermined interval when the gas is first injected into the mat.

27. The method of claim 23, further including the step of choosing a base material including thermoplastic fluff.

28. The method of claim 27, further including the step of forming the base material into a mat prior to the step of injecting and the step of compressing the mat to a first density of not more tan fifteen pounds per cubic foot at least during part of the step of injecting so that the mat remains substantially porous.

* * * * *

UNITED STATES PATENT AND TRADEMARK OFFICE
CERTIFICATE OF CORRECTION

PATENT NO. : 5,824,246
DATED : October 20, 1998
INVENTOR(S) : William R. Reetz and Ronald R. Taylor It is certified that error appears in the above-identified patent and that said Letters Patent is hereby corrected as shown below:

Title page, item [75], after "William R. Reetz, Boise Id." insert --Ronald R. Taylor, Boise, Id.--.

Signed and Sealed this

Nineteenth Day of December, 2000

Attest:

Q. TODD DICKINSON

Attesting Officer     Commissioner of Patents and Trademarks

UNITED STATES PATENT AND TRADEMARK OFFICE
CERTIFICATE OF CORRECTION

PATENT NO.    : 5,824,246
DATED         : October 20, 1998
INVENTOR(S)   : William R. Reetz and Ronald R. Taylor It is certified that error appears in the above-identified patent and that said Letters Patent is hereby corrected as shown below:

On the Title page,
please correct the Inventors, item [75], which should read: William R. Reetz and Ronald R. Taylor Signed and Sealed this First Day of May, 2001

Attest:

NICHOLAS P. GODICI

*Attesting Officer*    Acting Director of the United States Patent and Trademark Office